G. GODDU.
MACHINE FOR INSERTING FASTENERS.
APPLICATION FILED JUNE 23, 1909.
1,217,089.
Patented Feb. 20, 1917.
12 SHEETS—SHEET 8.
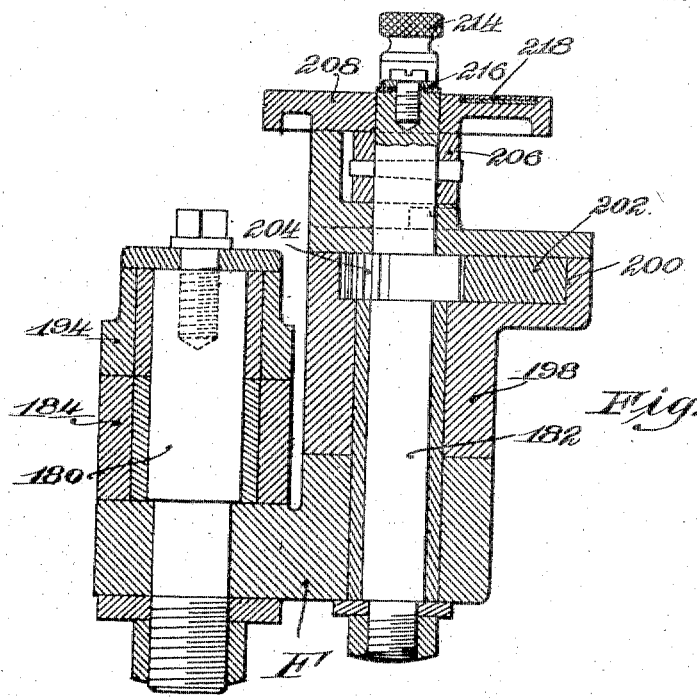
Fig. 12.
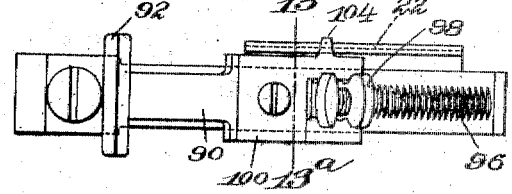
Fig. 13.
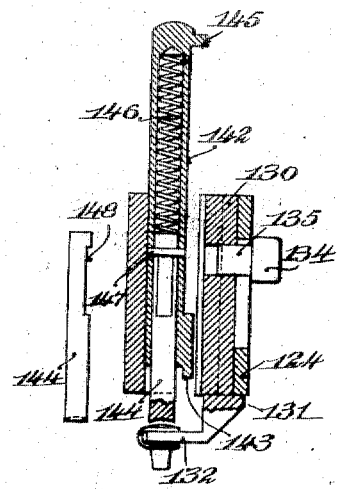
Fig. 14.
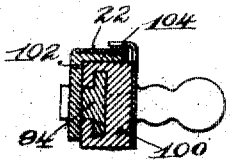
Fig. 13ª.
Witnesses.
Edward S. Way
Warren G. Ogden
Inventor
George Goddu
by his Attorneys
Phillip, Van Everen & ___

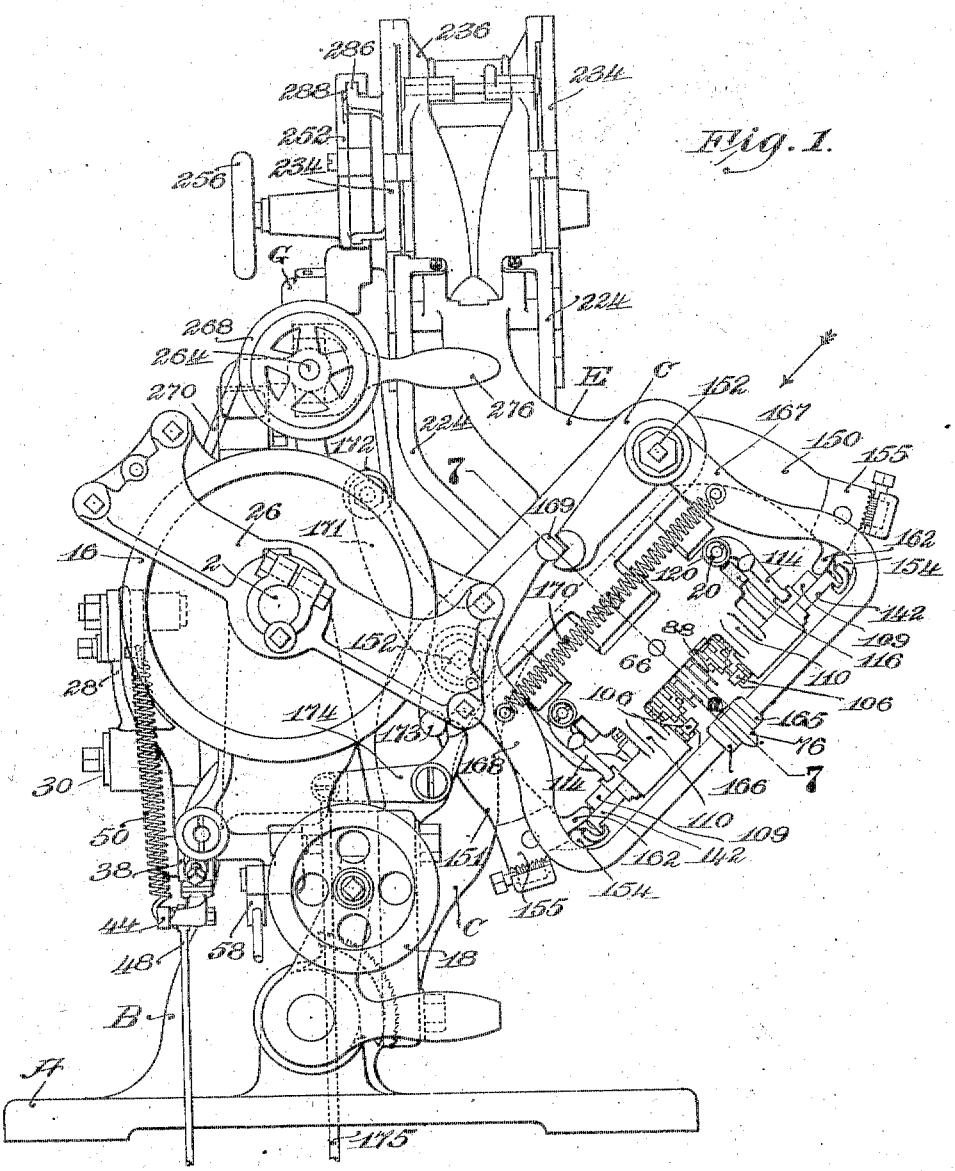

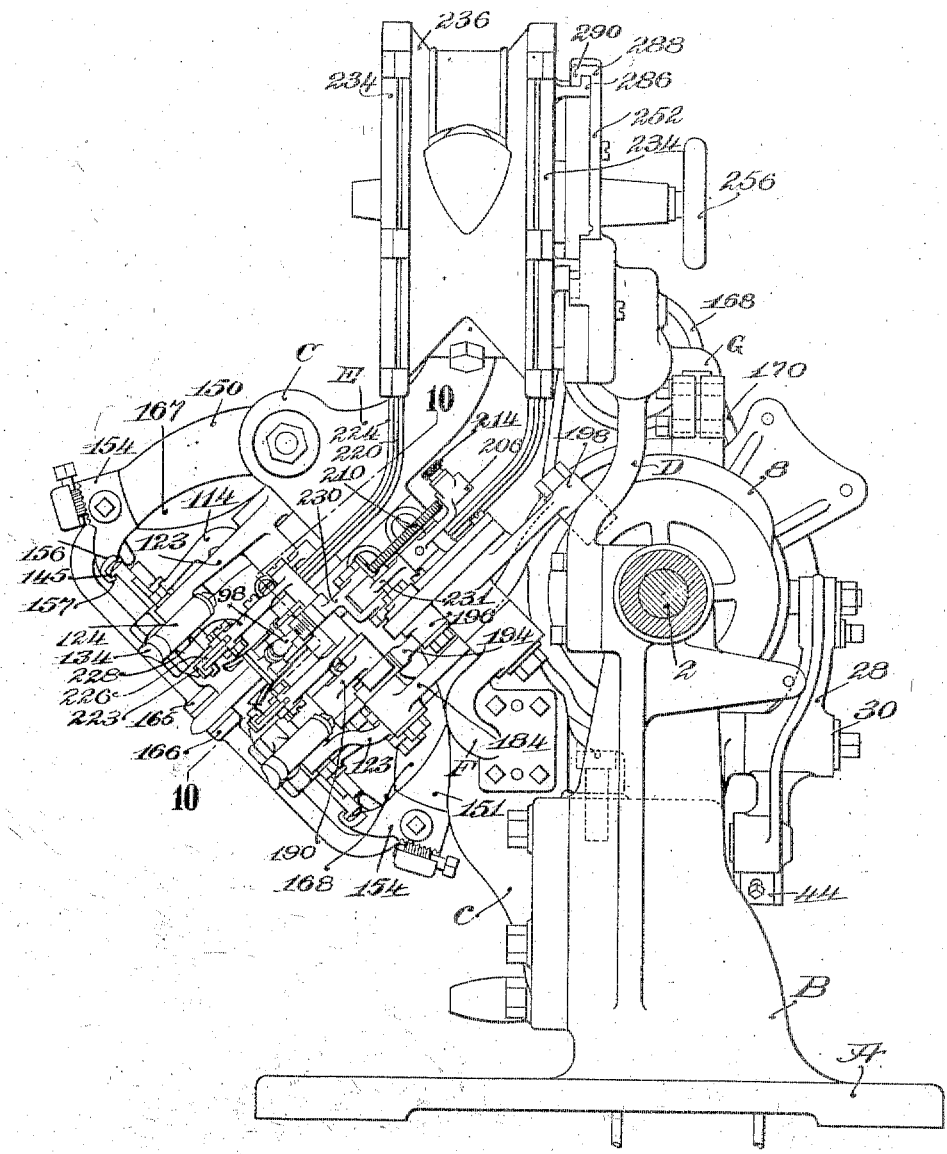

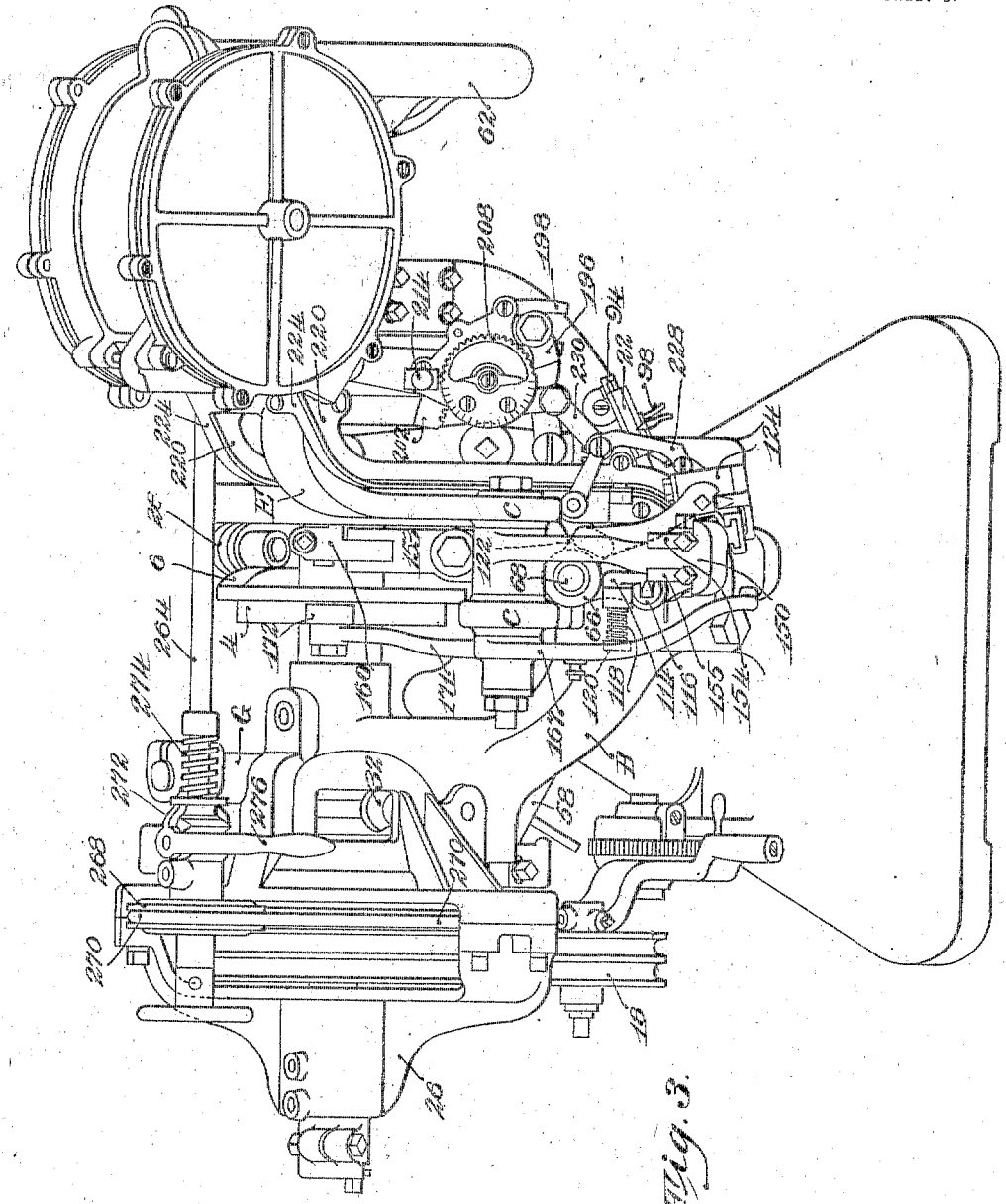

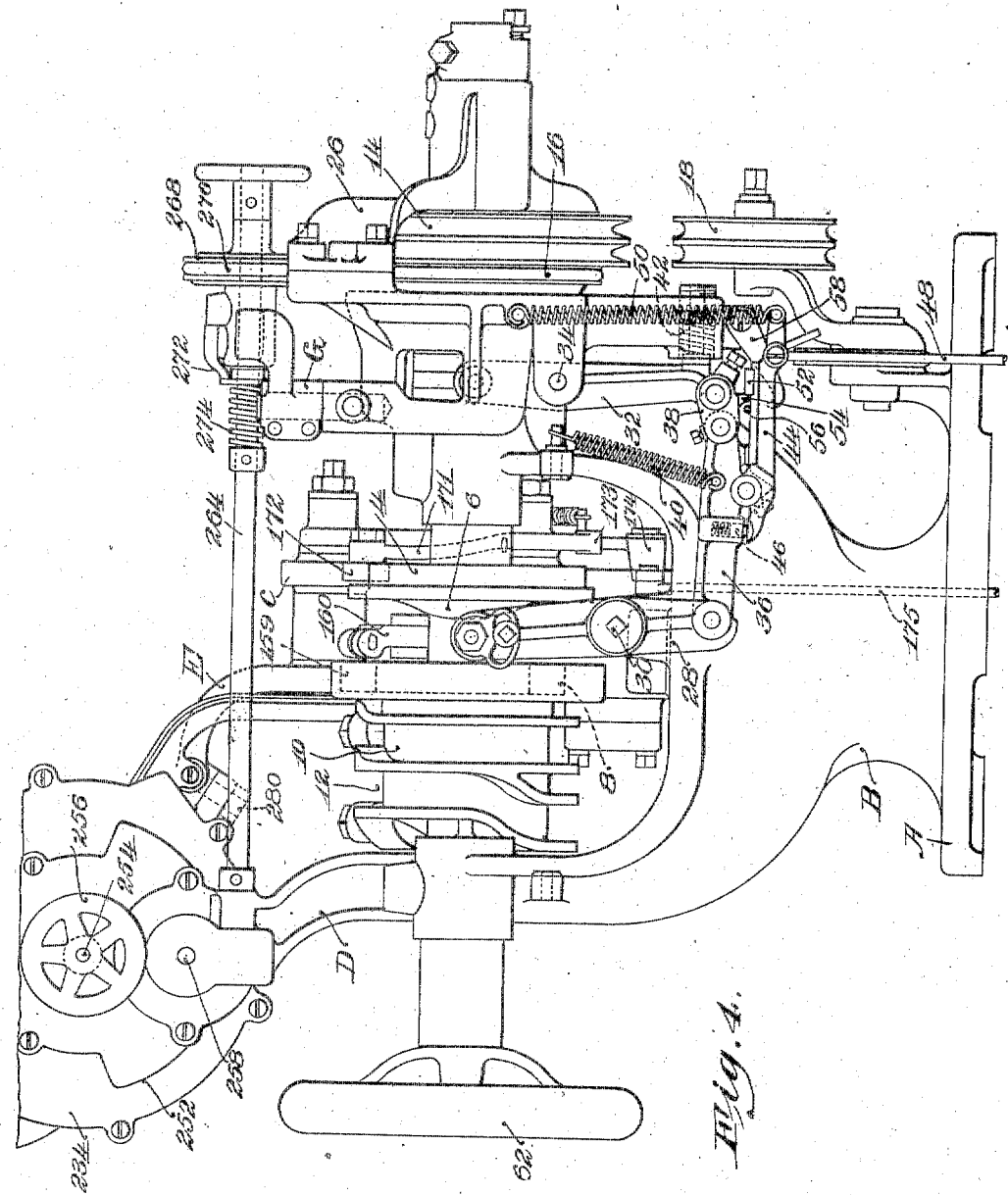

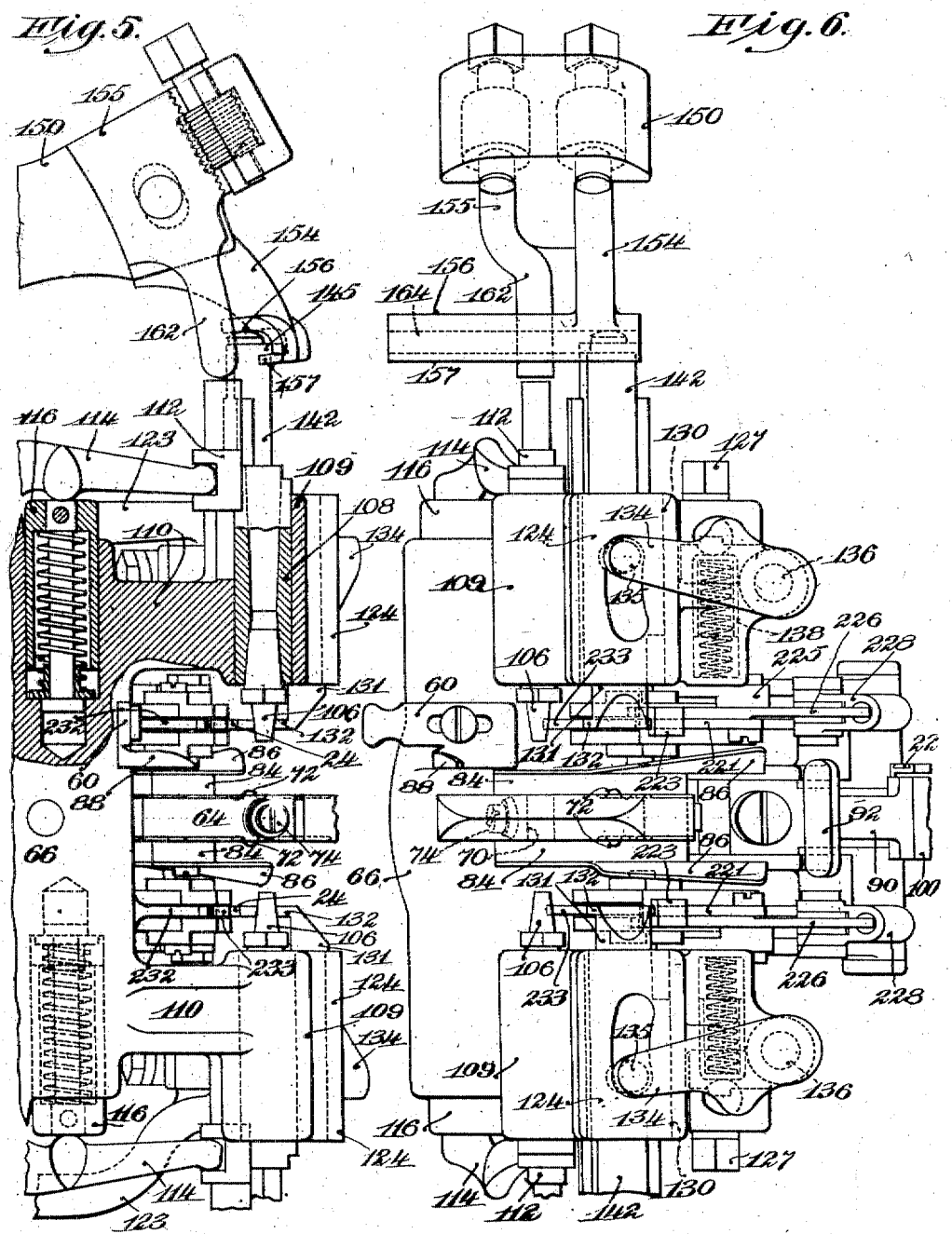

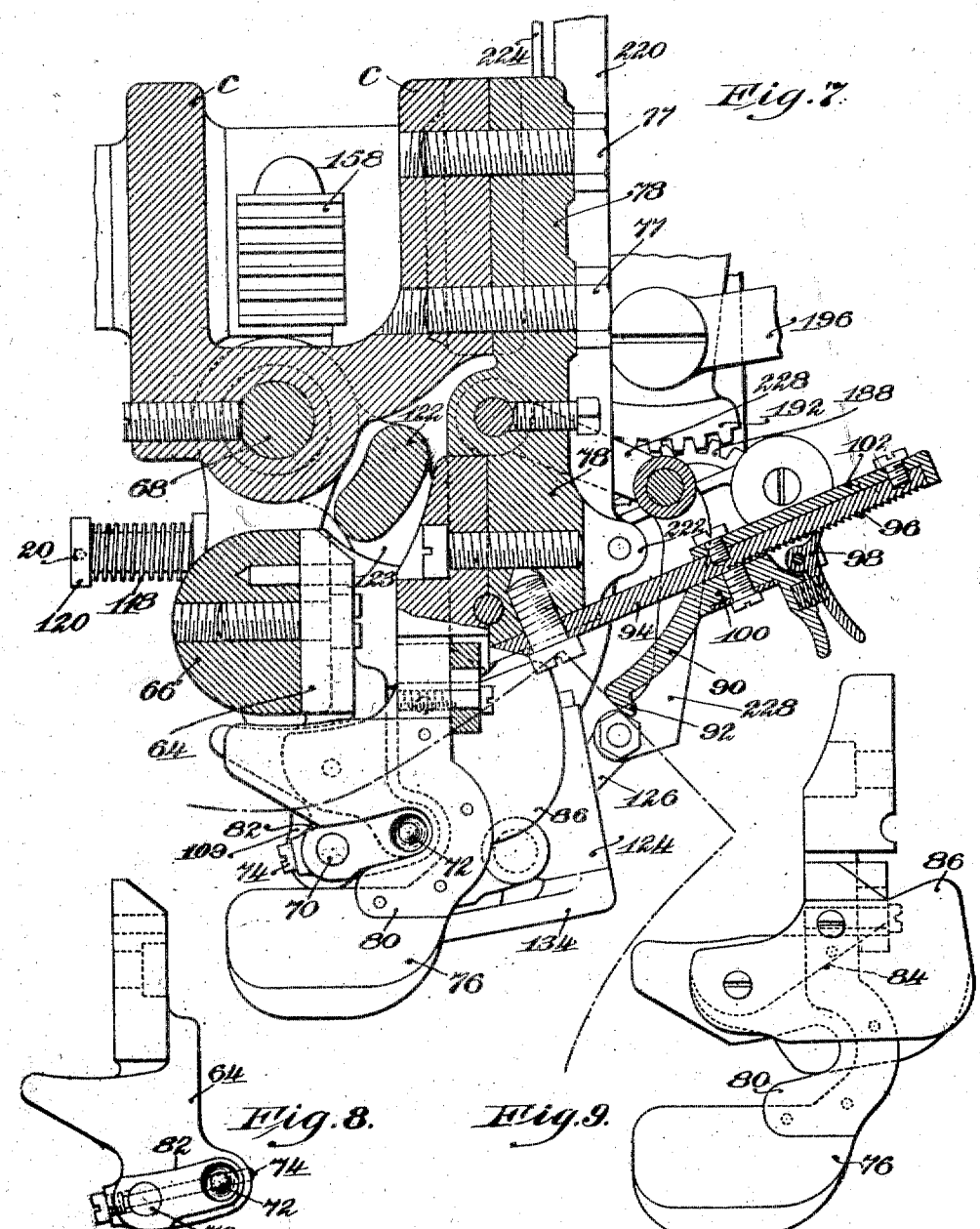

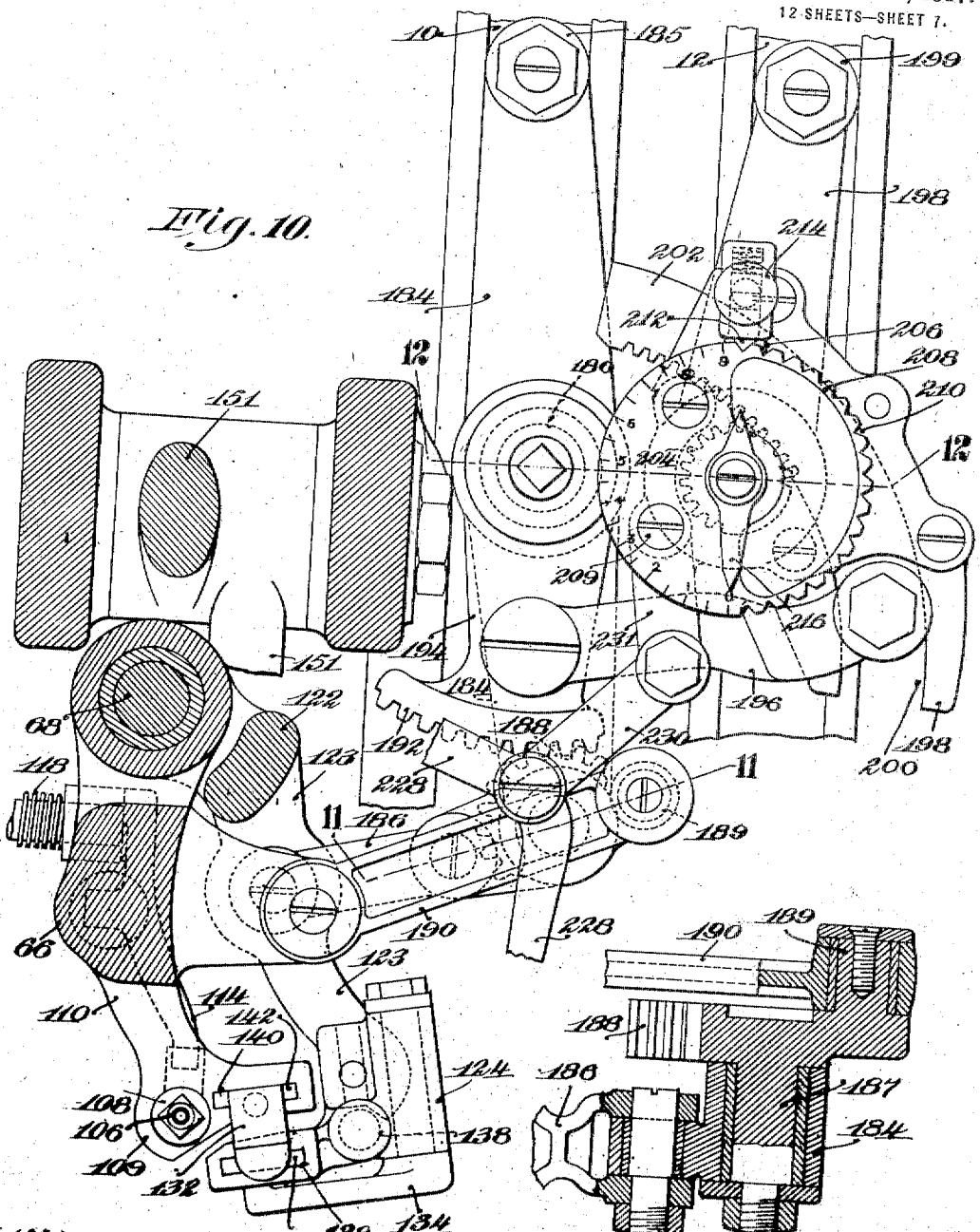

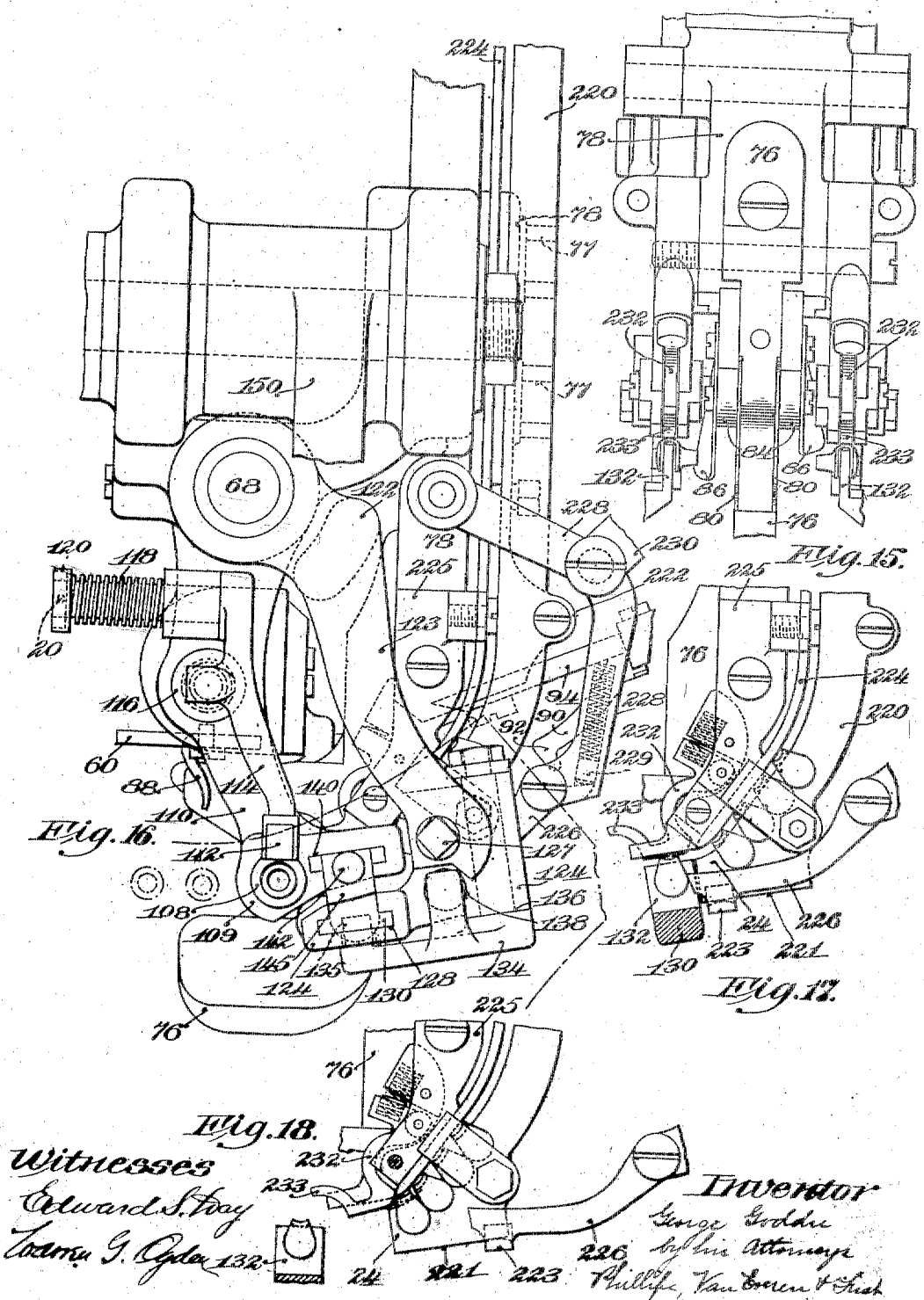

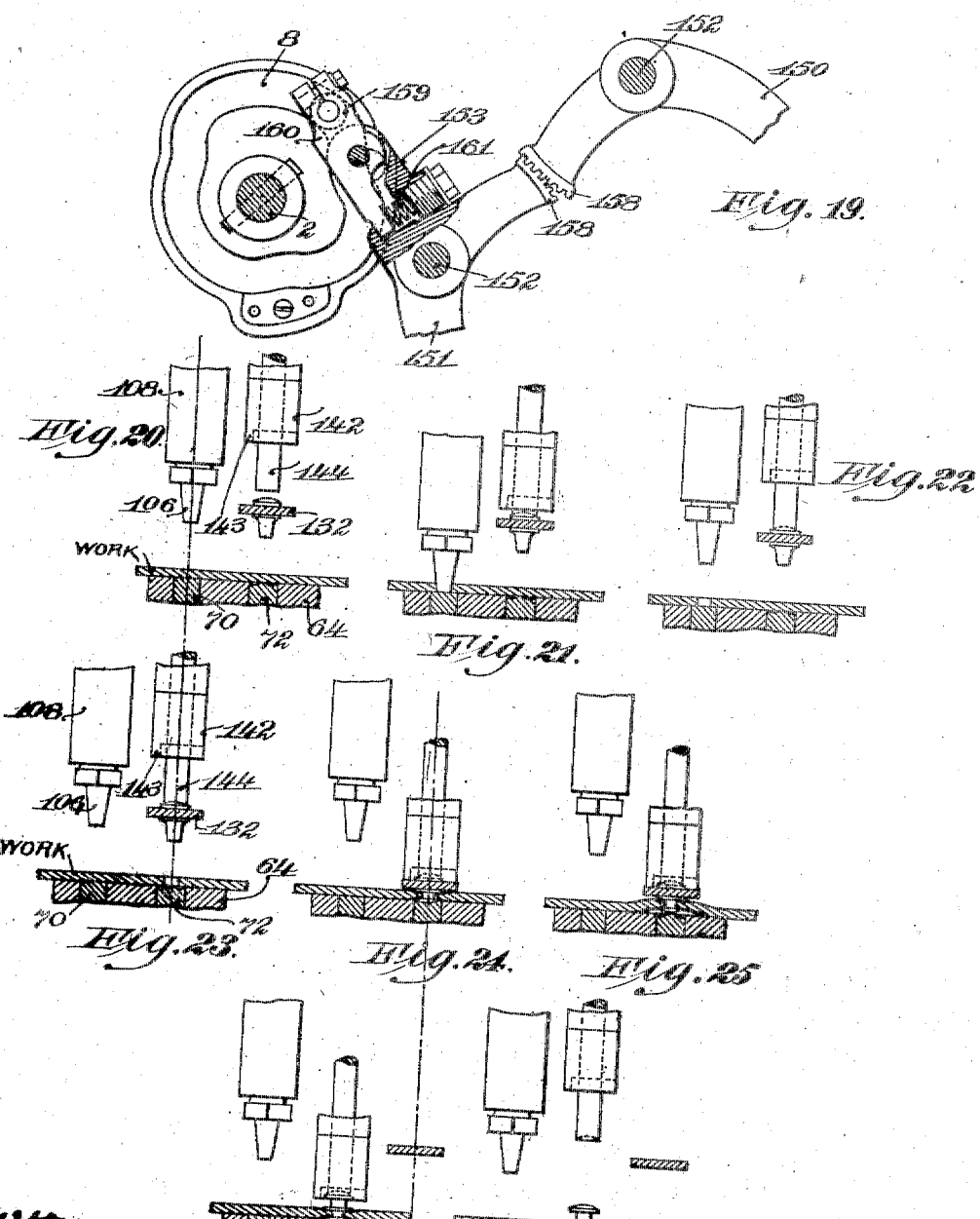

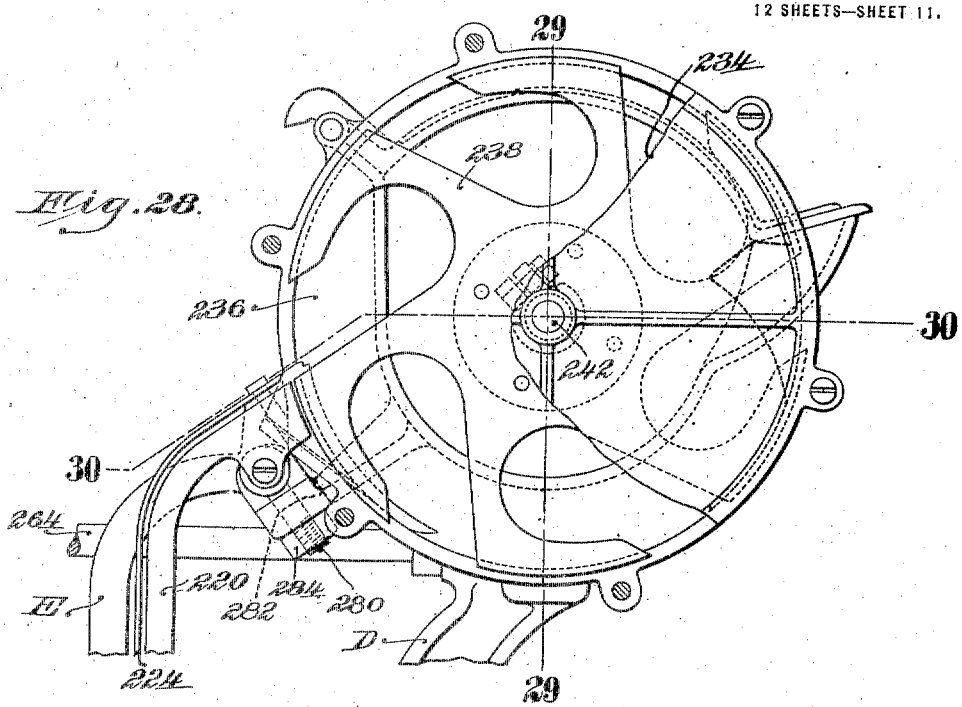
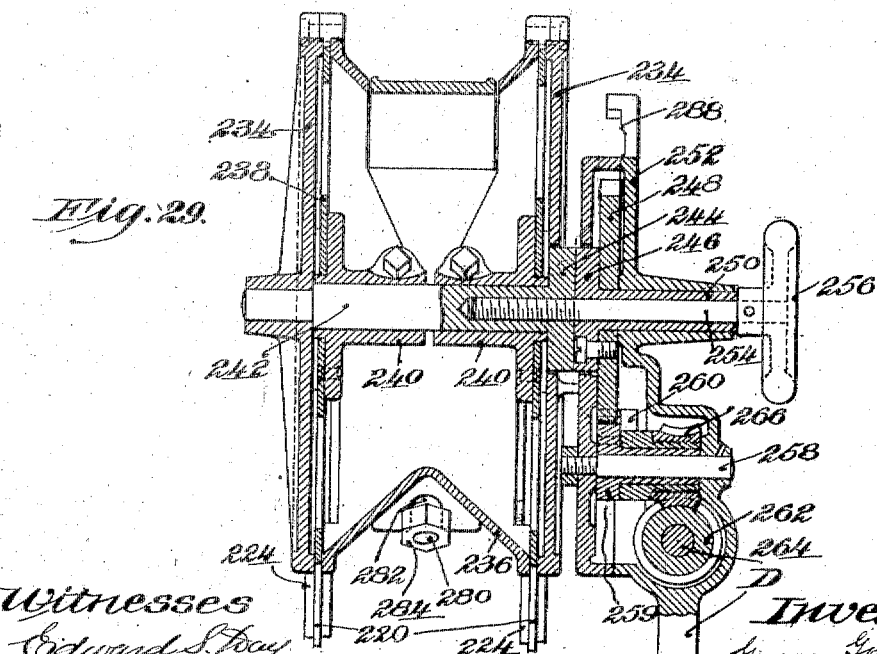

G. GODDU.
MACHINE FOR INSERTING FASTENERS.
APPLICATION FILED JUNE 23, 1909.

1,217,089.

Patented Feb. 20, 1917.
12 SHEETS—SHEET 12.

Witnesses
Edward S. Day
Warren T. Ogden

Inventor
George Goddu
by his Attorneys
Phillips, Van Everen & Fish

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENERS.

1,217,089.  Specification of Letters Patent.  Patented Feb. 20, 1917.

Application filed June 23, 1909. Serial No. 503,781.

*To all whom it may concern:*

Be it known that I, GEORGE GODDU, a citizen of the United States, residing at Winchester, in the county of Middlesex and State of Massachusetts, have invented certain new and useful Improvements in Machines for Inserting Fasteners; and I do hereby declare the following to be a full, clear, and exact description of the invention, such as will enable others skilled in the art to which it appertains to make and use the same.

This invention relates to machines for inserting fasteners, and more particularly to machines for setting lacing hooks or studs, although certain features of the invention are also applicable to machines for inserting other forms of fasteners.

One object of the present invention is to provide, in a machine for setting lacing hooks in two oppositely disposed sheets of material such as the opposite sides of a shoe upper, means acting to perforate the two layers of material in advance of the hook setting operation.

Another object of the invention is to provide, in a duplex hook setting machine employing both perforating and setting devices, means for delivering hooks to the setting devices and mechanism for moving the setting devices, after having received hooks, relatively to the work to bring them into position to set the hooks carried thereby in the previously formed perforations.

Another object of the invention is to provide, in a fastener inserting machine employing a perforating device, an improved mechanism for positioning the fastener and thereafter feeding the work, preferably by means of the setting devices, affording a variable movement of said devices when engaging the work to vary the spacing of the fasteners, but permitting an initial constant movement relative to the work to place said devices in fastener setting position.

Another object of the invention is to provide improved gaging devices, for use when operating on a shoe upper, which insure the placing of the upper in correct position to receive the first lacing hook in both "blind" and "through and through" work.

Other objects of the invention are to improve the construction, arrangement and mode of operation of the work-feeding and fastener-feeding and setting mechanisms of machines of this character.

With these objects in view, one feature of the present invention consists in the provision, in a machine for setting lacing hooks in the two oppositely disposed sides of a shoe upper, of a pair of oppositely disposed hook setting devices, and a pair of oppositely disposed punches for perforating the two sides of the upper in advance of the operation of the hook setting devices.

In accordance with a further feature of the invention the hook setting devices, in a machine employing means to perforate the stock in advance of the setting operation, are mounted on a movable frame, said devices being held normally at the end of the hook supplying raceway in a position to receive hooks. Means is provided to actuate the movable frame, after a hook has been delivered to the setting devices, before an engagement of the hook with the work and while the work is held clamped against movement, to bring the hook to setting position relatively to the hole made for its reception by the punches.

That feature of the invention which relates to the improved work-feeding mechanism contemplates the provision of a device to hold the hook on a movable anvil, which forms a part of the setting devices, and the mounting of the anvil on the one hand, and the hook holding device and the punch on the other hand, on independent movable frames having a special actuating mechanism. The actuating mechanism is constructed to provide a movement of all of the parts carried by the movable frames in unison to move the hook from the end of the raceway to setting position, which is a constant distance, and after the hook has been set to move the frame carrying the hook holding device and punch, while said device is still in engagement with the hook, relatively to the anvil to remove the hook therefrom and feed the work. Means is provided for varying the extent of this latter movement, to vary the spacing of the hooks, without affecting the extent of the initial movement.

In accordance with another feature of the invention separate gages are provided for "blind" and "through and through" work. In performing both of these classes of work the upper is gaged by its edges adjacent the lacing slit, but in the former class of work it is in addition gaged by the top edge of the upper, and in the latter class of work it is in addition gaged by one of the eyelets preferably the uppermost. Both of the auxiliary gages are adjustable for use with different sizes of shoe uppers.

Although those features of the invention which relate to the improved fastener positioning and work feeding mechanisms, and to the improved gaging devices, are in their illustrated embodiment applied to a machine for inserting fasteners simultaneously in two superimposed sheets of material, these features of the invention, as defined by the claims, are not limited in their application to this type of machine but are equally applicable to a machine for inserting fasteners in a single sheet of material.

The features of the invention hereinbefore referred to, including certain details of construction and combinations of parts as will hereinafter appear, will be further explained in the following description and then particularly pointed out in the appended claims.

The preferred embodiment of the invention is illustrated in the accompanying drawings, in which—

Figure 1 is an elevation of the left hand side of the machine;

Fig. 2 is an elevation of the right hand side of the machine with the hand wheel removed;

Fig. 3 is a plan looking in the direction of the arrow, Fig. 1;

Fig. 4 is a rear elevation of the machine;

Fig. 5 is a detail, in side elevation and partly in section, showing the punch and set mounting and actuating mechanism;

Fig. 6 is a front elevation of the parts shown in Fig. 5;

Fig. 7 is a horizontal section on the line 7—7 of Fig. 1;

Fig. 8 is a detail, in plan, of the die carrier detached from its supporting bracket;

Fig. 9 is a detail, in plan, of the guide plate and associated gages detached from its support;

Fig. 10 is a plan, partly in section, on the line 10—10 of Fig. 2;

Fig. 11 is a vertical section on the line 11—11 of Fig. 10;

Fig. 12 is a vertical section on the line 12—12 of Fig. 10;

Fig. 13 is a detail, in front elevation, of the blind hook work gage detached from its support;

Fig. 13ᵃ is a transverse section on the line 13ᵃ—13ᵃ of Fig. 13

Figure 30:
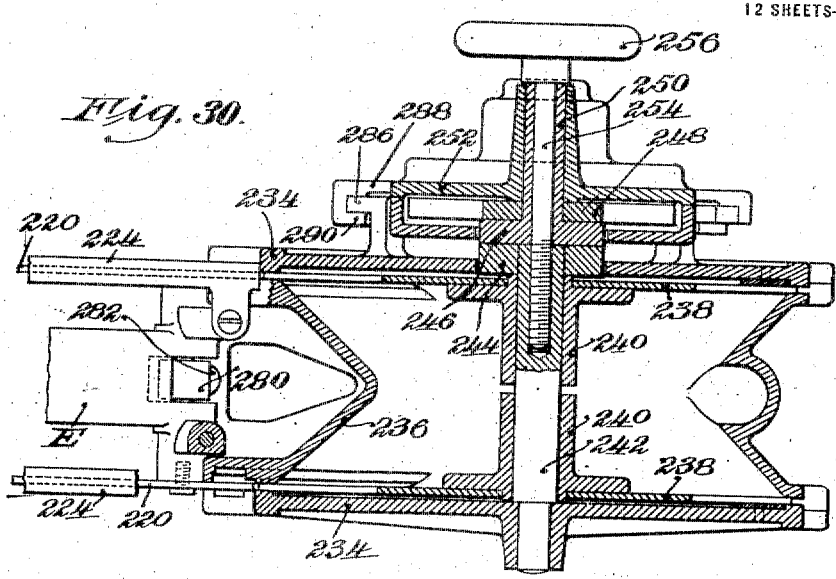

Fig. 14 is a detail, in vertical section, of the hook anvil and hook holding plunger, the plunger pin being shown removed from its carrier;

Fig. 15 is a detail, in side elevation, of the ends of the raceways and associated parts;

Fig. 16 is a detail, in plan, of the perforating and hook setting devices above the guide plate with the punch and set operating lever removed;

Fig. 17 is a detail, in plan, of a portion of the hook separating mechanism;

Fig. 18 is a detail, in plan, of the same parts shown in Fig. 17 but showing another step in the hook separating movement;

Fig. 19 is a detail, partly in section, of the punch and set levers and their operating cam;

Figs. 20 to 27 are diagrammatical views illustrating a complete cycle of operations of one of the punches and setting and work feeding devices;

Fig. 28 is a front elevation of the hook hopper, the cover plate being partly broken away to show the interior mechanism;

Fig. 29 is a vertical section on the line 29—29 of Fig. 28;

Fig. 30 is a horizontal section on the line 30—30 of Fig. 28; and

Figure 31:
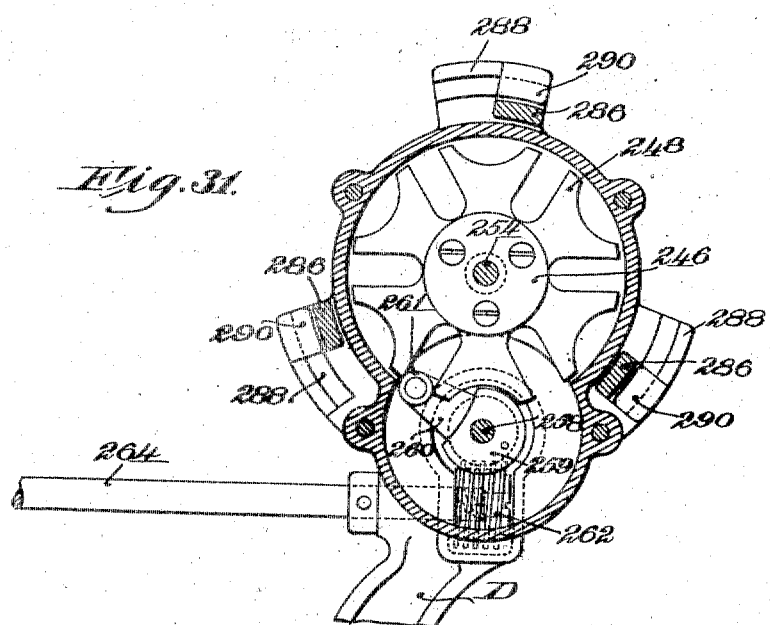

Fig. 31 is a detail, in elevation, of the driving mechanism for the picker plates within the hopper.

In the embodiment of the invention illustrated in the drawings, and referring first more particularly to Figs. 1 to 4, the machine is provided with a flat base A adapted to rest upon a bench of suitable height and from this base there rises a U-shaped frame B (Figs. 3 and 4) from the front of which there projects a forward bracket C (Figs. 1 and 2), which directly supports the punches, sets, work feeding devices and their operating mechanism. The right hand arm of the U-shaped frame B is provided with an upwardly projecting bracket or support D (Figs. 2 and 4) which forms the main support for the lacing hook hopper although this hopper is further supported by means of a casting E (Figs. 1 and 2) extending rearwardly from the top of the forward bracket C.

The driving shaft 2 extends across the machine and is journaled in suitable bearings at the upper ends of the arms of the U-shaped frame B. This shaft carries the cams which operate the various moving parts. These cams are five in number and are mounted upon three cam disks, as is best shown in Fig. 4. The cam disk farthest to the right in said figure is provided with a peripheral cam 4 which operates the work clamps and is also provided with a face cam 6 which operates the main clutch of the machine. The central cam disk is provided with a groove cam 8 in one of its faces, shown in dotted lines in Fig. 4 and in full lines in Fig. 19, which operates the punch and set levers. The cam disk at the left is in the form of a sleeve provided with two peripheral groove cams 10 and 12, the former of which operates the hook carrying mechanism and the latter of which operates the work feeding mechanism.

Still referring to Fig. 4, the main clutch is mounted at the left hand end of the driving shaft (at the right in Fig. 4) and in its construction and operation, with the exception of the controlling mechanism presently to be described, it is similar to the clutch shown in the patent to John F. Davy and Sherman W. Ladd No. 672,056, dated April 16, 1901. The loose member of the clutch is provided with a pair of sheaves 14 and with a third sheave 16, to be referred to hereinafter. Beneath the sheaves 14 is mounted an adjustable belt tightener 18 (Figs. 1 and 3) in the form of an idle sheave journaled upon a suitable support which is fulcrumed on a bracket rising from the base A. The belt tightener is adjusted relatively to the sheaves in any usual or common manner. The left hand end of the driving shaft, beyond the clutch, is provided with a suitable thrust bearing supported in a thrust bearing bracket 26 (Figs. 1 and 3).

The controlling mechanism for the clutch is best shown in Figs. 1 and 4 and is an improvement over that shown in the patent to Davy and Ladd, hereinbefore referred to, but as it forms no part of the present invention a brief description thereof will suffice. A clutch cam lever 28 is pivoted on the machine frame at 30 and is provided at its upper end with a cam roll which engages the clutch cam 6. A clutch lever 32 is pivoted on the machine frame at 34 and is provided with a yoked upper end which engages the longitudinally movable member of the clutch in the manner shown in Patent No. 672,056. The lower ends of the levers 28 and 32 are connected by means of a toggle composed of two arms 36 and 38. A spring 40 extends from the toggle arm 36 to a pin on the machine frame and acts to maintain the clutch cam roll in contact with its cam. A stiff coiled spring 42 (dotted lines Fig. 4) is seated in a socket in the machine frame and bears upon a plunger which engages the lower end of the lever 32 and acts normally to maintain the two parts of the clutch engaged, or in operative position. So long as the toggle arms 36, 38 are held in alinement, and they are normally so held by means of the spring 40, a rotation of the driving shaft will cause the clutch cam 6 to operate through the toggle as a rigid link to move the lever 32 about its fulcrum in a direction to separate the two parts of the clutch and stop the operation of the machine. The machine will stop with the clutch cam 6 in the relation to its roll which is shown in Fig. 4. So long as the clutch cam and roll remain in this relation the spring 42 cannot act to move the lever 32 in a direction to throw the clutch into operation again unless the toggle is broken so as to permit a movement of the lever 32 about its pivot. In order to provide means whereby the toggle may readily be broken by a very slight pressure upon it, the toggle arm 36 has pivoted thereto a curved lever 44 one end of which is borne upon by a spring pressed plunger 46 seated in the toggle arm 36 and to the other end of which there is connected a depending rod 48 operated by a treadle (not shown). A light coiled spring 50 connects the treadle rod end of lever 44 with the machine frame being merely of sufficient strength to counterbalance the weight of the treadle rod and treadle. The lever 44 is provided with a block 52 on its upper side which, when the machine is at rest, is borne upon by a lug 54 on the toggle arm 38. The relative positions of the block 52 and lug 54 are such that the toggle arms under the action of the spring 40 are maintained slightly out of alinement, as shown in Fig. 4. With the parts in this position a very light pressure upon the treadle will be sufficient to withdraw the block 52 from its engagement with the lug 54 and because of the inclination of the toggle arms to each other, the toggle is immediately and easily broken by the pressure of the clutch spring 42 which then acts on the lever 32 to throw in the clutch. Rotation of the driving shaft immediately moves the clutch cam 6 from beneath the roll upon the clutch lever 28 and if the pressure upon the treadle is removed the toggle and its connected parts will be returned to the position shown in Fig. 4 by means of the spring 40, the pin 56 on the lever 44, and to the right of the lug 54, preventing the toggle being entirely straightened. At the end of a single revolution, the clutch cam 6 will again act upon the lever 28 and through the toggle, which is locked with its arms in alinement by engagement of the lug 54 with the block 52, will again throw out the clutch. The driving shaft will continue to rotate as long as the treadle is maintained depressed.

In order to turn the machine over by hand the usual latch or lock lever 58 (Figs. 1, 3 and 4) for maintaining the clutch disengaged is provided. The driving shaft is provided with a hand wheel 62 at its right hand end by which it may be turned after the locking lever 58 has been placed in position to render the clutch inoperative.

Referring now more particularly to Figs. 5, 7 and 8, the die holder 64 is detachably mounted upon a laterally swinging frame or arm 66 fulcrumed upon a vertically arranged stud 68 suitably journaled in bearings at the front of the forward bracket C (see Figs. 1 and 3). In the die holder two double dies are supported, namely, a two faced punch block 70 and a double ended set die 72. These dies are both in the line of feed and are held in place by means of a screw headed pin 74 (Fig. 8). The arrangement is such that perforations may be made in the stock and fasteners may be set on each face of the die holder. The die holder is so formed as to enter a recess in a guide plate 76 (Fig. 9) which is detachably mounted upon a supporting plate 78 in turn detachably mounted upon the forward bracket C. The purpose of mounting the plate 78 for removal will be explained hereinafter. The guide plate 76 is provided with guard plates 80 upon its upper and lower surfaces, the edges of which surround raised portions 82 on the faces of the die holder so that a smooth, unbroken surface about the block and die is provided upon which to rest the stock (see Figs. 5 and 7). The guide plate 76 is provided with the usual edge gages 84 at each of its sides against which the edges of the lacing slit of the upper are guided and the gages are in turn provided with flaring guide wings or plates 86 (Figs. 6 and 9) to facilitate the entrance of the sides of the upper to working position over the block and die.

Separate gages, supplementing the edge gages 84, are also provided. One of these gages is used when operating upon "blind hook" work and the other when operating upon "through and through" work. In performing the latter class of work, the lacing hooks are set after the eyelets are set and, therefore, it is desirable to space the hooks with relation to the uppermost eyelet. To permit this a detachable gage in the form of a finger 88 (Figs. 6 and 16) is mounted on the swinging arm 66 just above the die holder and to the left of the punch block. This gage finger projects from a slotted support 60 and is adjustable toward and from the punch block by loosening a holding screw passed through the slot. The gage finger is adjusted until its distance from the punch block equals the distance it is desired the lowermost hook to be located from the uppermost eyelet and the upper is then initially placed in the machine with the uppermost eyelet opposite the gage finger. In "blind hook" work the lacing hooks are set in the upper prior to the setting of the eyelets and, therefore, the position of the lowermost hook should be gaged from the top edge of the quarter. For this class of work the edge gages 84 are supplemented by a top gage comprising a finger 90 (Fig. 7) having a foot 92 (Fig. 13) of sufficient width to engage the top edge of the quarter at both sides of the shoe as it rests upon the die plate.

The gage finger 90 is adjustably mounted, for movement toward and from the punch block, upon a support 94 removably secured to the bracket 78. Any convenient mechanism for adjusting the foot 92 toward and from the punch block may be used. In the illustrated embodiment of the invention a series of teeth 96 are formed on the face of the support 94 and these are engaged by a spring pressed pawl 98 mounted upon a sliding carriage 100, from which the finger 90 projects. The support 94 is T-shaped in cross-section (Fig. 13ª) and the carriage 100 is provided with a T-slot, and is held in place on the support by means of a cover plate 102. The cover plate 102 is provided with a table 22 projecting over the adjustable carriage and a pointer 104 is mounted on the carriage which projects over the table. The table 22 may have a surface formed of celluloid and any convenient series of marks may be made thereon by which to set the gage foot 92 to any particular size or style of shoe in which the operator may wish to set hooks.

Referring now more particularly to Figs. 5, 6, 10 and 16, the two punches 106, which coöperate with the double punch block, are frictionally mounted in sleeves 108 vertically slidable in guideways formed for their reception in heads 109 at the forward ends of brackets 110 projecting from the swinging arm 66. The sleeves 108 are each provided with an inwardly projecting yoke block 112 (Fig. 5) which slides vertically in a slot at the inner side of the guideways for the sleeves 108. The yoke blocks 112 have transverse slots which are engaged by the forward ends of levers 114 (Figs. 1, 5 and 16) pivoted at their rear ends upon the swinging arm 66. Each of these levers and its connected punch are normally held away from the die holder by self-contained spring-pressed plungers 116 (Figs. 5 and 16) seated in sockets formed for their reception within the swinging arm 66. The details of construction of these plungers are clearly shown in Fig. 5 and, as they form no part of the present invention, a detailed description will be omitted. The spring plungers 116 are styled "self-contained" plungers because their construction is such that when the levers 114 are removed they may be withdrawn from their respective sockets bodily, as one single piece. In order to render the levers 114 readily removable to in turn permit removal of the punches, their fulcrums are extended to the left (Fig. 16) and are surrounded by coiled springs 118, one end of which, in each case, bears against the journal for the fulcrum pin and the other end of which bears against a cup-shaped washer 120 which is held in place upon its fulcrum pin by means of a lock pin 20 (Fig. 1) equal in length to the diameter of the interior of the cup-shaped washer with which it coöperates. By pressing upon the cup-shaped washer, the spring 118 is compressed and the locking pin 20 may then be removed. The removal of the lock pin leaves the fulcrum pin for the lever free to be moved through its journal. A movement of either of the levers 114 in this manner causes a disengagement of the lever and the block 112 on the punch supporting sleeve 108. Both the spring plunger 116 and punch 106 are then free to be removed.

The hook setting devices are shown most clearly in Figs. 2, 3, 10, 14 and 16, and in each instance they comprise, in addition to the set die 72, an anvil to receive the hook from the raceway, and preferably a hook holding device for maintaining the hook upon the anvil during the setting operation. In the present embodiment of the invention the hook holding devices retain their hold upon the hook until the completion of the work feeding operation. The anvils for receiving the hooks are mounted upon a second swinging frame or arm 122 fulcrumed upon the stud 68 which forms the fulcrum of the swinging arm 66. The swinging arm 122 is provided with a pair of forwardly projecting brackets 123 located above and below the die holder (Figs. 10 and 16). Each of the forwardly projecting members sustains a removable head 124 held in place by a set screw 127. Each of the heads 124 is provided with a vertically arranged T-slot 128 and in this slot is a plunger 130 having at its inner end a flange 132 (Fig. 14) which forms the hook anvil of the setting devices. The hook anvils which, because they receive the hooks from the raceways, may be termed hook supporting plates are normally maintained retracted from the die holder, and in the planes of the raceway ends 24, by means of levers 134 (Fig. 6) having pins 135 passing through slots in the heads 124 and entering the holes for their reception in the plungers 130, which levers are pivoted at 136 in the heads 124 and are normally maintained pressed outwardly by means of spring pressed plungers 138. Each plunger 130 is provided with a shoulder 131, to engage the head 124, and limit its outward movement. The anvils or hook supporting plates 132 are, therefore, normally maintained retracted but are free to be depressed within the T-slots 128 at any time. The hook holding devices are not mounted upon the swinging arm 122 but are mounted upon the swinging arm 66 in the same heads which sustain the punches. Each of these punch supporting heads is provided with a T-slot 140 (Figs. 10 and 16). These slots receive plungers 142 having feet 143 which, when the plungers are depressed, engage the anvils 132 adjacent the heads of the hooks thereupon. Each of the plungers 142 (Fig. 14) is recessed for the reception of a sliding pin 144 normally maintained depressed by a spring 146 within the plunger. The movement of the pins 144 within the plungers is limited by cross pins 147 engaging shoulders formed by the ends of slabbed off portions 148 on the pins 144. The lower or engaging ends of the plungers 144 are concaved so as to fit the heads of and center the hooks which they engage.

At the time hooks are delivered from the raceways to the anvils, the relative position of the swinging arms 66 and 122 is such that the setting dies, hook holding devices and anvils are all in alinement so that after the anvils have received their hooks an inward movement of the plungers 142 will first cause the pins 144 to engage the heads of the hooks to hold them upon the anvils and will thereafter cause the feet 143 to engage the flanges of the anvils and move them inward against the force of the spring plungers 138 until the hooks are brought to setting position at the setting dies. The means for actuating the hook holding devices to perform the operations just referred to and also the means for actuating the punches to first perforate the stock will now be described.

Reciprocating movements are imparted to the plungers 142 at the proper times during the operation of the machine by means of bell-crank levers 150 and 151 pivotally mounted upon studs 152 at the upper and lower ends of the forward bracket C. These bell-crank levers are provided at their forward or free ends with blocks 154 (Figs. 2, 3, 5 and 6) each of which is provided with a shoulder 156 adapted to bear upon the outer end of a plunger 142 (see Fig. 5) and with a projection 157 adapted to extend beneath a forwardly extending projection 145 upon the plunger (Fig. 14). The plungers are thus positively reciprocated in both directions. In order to vary the path of the movements imparted to the plungers 142, as may be desired, the blocks 154 are adjustably secured to the bell crank levers in any convenient manner. The inner ends of the bell-crank levers 150 and 151 are provided with intermeshing teeth 158 (Fig. 19) and the lever 151 is provided with a third arm 153 upon which is mounted a cam roll 159 engaging the cam groove 8 in the central cam disk upon the shaft 2. Both of the bell crank levers are thus actuated from the same cam and the plungers 142, controlling the movements of the hook holding devices and hook anvils are reciprocated toward and from each other simultaneously. In order to prevent injury to the parts in case a hook is not in proper position when the plungers are actuated to set the hooks against the setting dies, the cam roll 159, instead of being mounted directly upon the arm 153, is mounted upon an auxiliary lever 160 (Fig. 19). This lever is pivotally connected to the arm 153 so as to be capable of a slight movement with relation thereto and is acted upon by a stiff spring 161 interposed between the inner end of the lever and a set screw threaded into the third arm of the bell crank lever.

In addition to the adjustable block 154 each of the bell crank levers carries a second adjustable block 155 (Fig. 5) which is provided with a downwardly projecting hammer 162 (Figs. 5 and 6) adapted to at times engage heads 112 at the upper ends of the sleeves 108 which sustain the punches 106. With this construction when the swinging arm 66 is in a position to bring the heads of the punch holding sleeves in alinement with the hammers 162, an inward movement of the bell-crank levers to actuate the hook holding devices will at the same time actuate the punches to perforate the stock. The vertical relation of the punches and hook holding devices and their actuating mechanisms is such that a movement of the levers 150 and 151 sufficient to cause the hook holding pins 144 to engage and center a hook is also sufficient to cause the punches to move inward to the punch blocks. The plunger engaging parts 156 and 157 of the adjustable blocks 154 are extended in the direction of feed (see Fig. 6) and form a track or guideway 164 in which the upper ends of the plungers 142 travel during the movement of the swinging arm 66 in the line of feed first to place the hook in setting position and thereafter to feed the work, as will be presently described.

After hooks have been delivered to the anvils and the hook holding devices have been actuated to engage the hooks and center and hold them firmly upon the anvils, a movement is imparted to the anvils in the line of feed to carry the hooks thereon to hook setting position, that is, opposite the perforations which have just been made in the stock by the punches. During this hook positioning movement of the setting devices, the work should be held stationary. After reaching hook setting position, the setting devices are actuated to set the hooks in the work and thereafter the work is fed. During the work feeding movement the work should be free to move past the guide plate 76 upon which it rests. To gain these ends, two clamping jaws 165 and 166, located respectively above and below the guide plate 76 (see Figs. 1, 2 and 3), are provided to coöperate with the faces of said guide plate in clamping the stock. These jaws are formed upon the forward ends of bell-crank levers 167 and 168 pivotally mounted upon the studs 152 which form the fulcrums for the punch and set levers 150 and 151. The inner ends of these bell-crank levers are connected by a knuckle joint 169 (Fig. 1) so that they may be operated in unison. A coiled spring 170 connects the forward arms of the bell-crank levers 167 and 168 and acts normally to maintain the jaws in engagement with the faces of the guide plate. The bell-crank lever 168 is provided with a third arm 171 (see dotted lines Fig. 1) provided with a cam roll 172 which engages the periphery of the clamping jaw cam 4 (Fig. 4). The cam 4 is so designed that while the machine is in operation the spring 170 is permitted to hold the clamping jaws 165 and 166 firmly against the work on the guide plate during the punching, hook positioning and hook setting operations. Thereafter they are opened by the operation of the cam and remain open and away from the work during the work feeding operation. Just before the hook setting and work feeding devices are returned to their position at the end of the raceway for the hook anvils to receive new hooks, the clamping jaw cam 4 permits the spring 170 to again actuate the jaws to clamp the work and hold it against any backward movement at this time. To allow the work to be inserted in and removed from the machine, it is necessary that the clamping jaws be moved away from the guide plate as when the machine comes to rest the cam 4 is in such an angular position that the jaws are in engagement with the guide plate. The bell-crank lever 168 is, therefore, provided with a lug 173 (Fig. 1) which is engaged by one arm of a bell-crank lever 174 fulcrumed upon the forward bracket C, the other end of the lever being engaged by the upper end of a treadle rod 175 connected to a treadle (not shown). By moving the treadle rod 175 downwardly the bell crank 174 is moved in a direction to turn the bell-crank levers 167 and 168 outwardly about their pivots and thus withdraw the clamping jaws from the guide plate. After the upper has been inserted in working position relatively to the various work guides, hereinbefore referred to, the treadle is released and the spring 170 immediately brings the clamping jaws into clamping position against the work and returns the cam roll 172 to a position where it engages its cam, thus placing the levers again in position to be controlled by the cam 4.

Suitable mechanism is provided for actuating the two swinging arms 66 and 122 in a manner first to move the hook setting devices and punches in unison until the anvils, or hook carriers, 132 have assumed hook setting position, that is, a position opposite the perforations made by the punches, and after the setting operation to move the hook holding devices relatively to the anvils, or hook carriers, while still in engagement with the clenched hooks so that by this operation the work is fed and the hooks are removed from their anvils. This mechanism is most clearly shown in Figs. 2, 3, 10, 11 and 12. Referring first to Figs. 2 and 12, the forward bracket C is provided at its right hand side with an auxiliary bracket F which projects upwardly and forwardly and supports two substantially vertical fulcrum studs 180 and 182. On the stud 180 there is pivotally mounted a lever 184 (Fig. 10) which at its rear end carries a cam roll 185 engaging the path cam 10 (Fig. 4). The forward end of this lever 184 is connected, by means of a link 186, to the lower bracket 123 of the swinging arm 122 which supports the anvils or hook carriers. The forward end of the lever 184 is also provided with a bearing in which is loosely journaled the stem 187 of a pinion 188. The pinion 188 is provided with a wrist pin 189 and this pin is connected by means of a link 190 to the swinging arm 66 which supports the punches and the hook holding devices. The pinion 188 meshes with a segment 192 at the forward end of a crank arm 194 loosely pivoted upon the fulcrum stud 180. During the operations of punching the stock and positioning the hook in the hook setting operation, the arm 194 is held stationary by means presently to be described. As both of the swinging arms 66 and 122 are connected by the links 190 and 186 respectively to the cam lever 184, it is obvious that any movement imparted to this lever by the cam 10 will impart a simultaneous and equal movement to the swinging arms. It is also obvious that as the pinion 188 is freely rotatable in the end of the cam lever 184 a rotation of this pinion, while the cam lever 184 is held stationary, will impart a movement to the swinging arm 66 relatively to the swinging arm 122. Such a movement may be given to the pinion by swinging the crank arm 194 provided with the segment 192 about its fulcrum 180. In order to swing the crank arm 194 and thus impart a movement to the swinging arm 66 alone, the crank arm is connected by a link 196 (Fig. 10) to the forward end of a cam lever 198 pivoted upon the fulcrum stud 182 and provided at its rear end with a cam roll 199, which is engaged by the cam groove 12 (Fig. 4). The cams 10 and 12 are timed to operate as follows: Referring to Fig. 10, the cam groove 10 first operates to throw the rear end of the cam lever 184 to the right, thus moving its forward end to the left and moving the punches, hook holding devices and the anvils, or hook carriers, away from the ends of the raceways. The distance to be traversed in this movement, which places the hook setting devices in setting position, is always constant as it is equal to the distance between the setting die 72 and the punch block 70 in the die holder. During this movement the cam 12 is idle and the crank arm 194 is, therefore, held stationary. After the hooks have been set by the proper actuation of the punch and set levers 150 and 151 by the cam 8, the cam 12 operates to move the rear end of its cam lever 198 to the left, in Fig. 10, which imparts a movement to the crank arm 194 to the right and because of the engagement of the segment 192 with the pinion 188, the pinion is rotated in its journal in the cam lever 184 in a clockwise direction which, through the wrist pin 189, imparts a movement to the link 190 to the left. This movement of the link 190 is transmitted to the swinging arm 66 and the movement of the arm carries the punches and the hook holding devices in the line of feed and removes the hooks from their carriers.

The amplitude of the work feeding movement of the swinging arm 66 varies in accordance with the desired spacing between the hooks which are being set. In order to vary the spacing between the hooks the cam lever 198 is so constructed that its effective length may be changed. Still referring to Figs. 10 and 12, the cam lever 198 is provided with a curved guideway 200 having the pivotal connection of the link 196 with the crank arm 194 as a center and in this guideway there is mounted a curved slide 202 to which the right hand end of the link 196 is pivoted. By changing the position of the slide 202 in the guideway 200, the distance of the pivotal connection between the link 196 and the cam lever 198 from the fulcrum on the cam lever is varied and, therefore, the effective length of the cam lever 198 is changed. A convenient mechanism for shifting the position of the slide 202 in its guideway may be constructed as follows. The fulcrum stud 182 for the cam lever 198 is provided with a pinion 204 (Fig. 12), the teeth of which mesh with teeth formed on the inner curved surface of the slide 202. Pinned to the fulcrum stud 182 above the pinion 204 is a crank 206 which projects outwardly beyond the periphery of a disk 208 centered on the fulcrum stud 182. This disk is rigidly secured to the cam lever 198 by means of screws 209. A portion of the circumference of the disk 208 is provided with notches 210 which are engaged by a spring pressed latch 212 mounted in the end of the crank 206. This latch is so constructed that it may be withdrawn from engagement with the notches 210 by rotating the handle 214. To the upper end of the fulcrum stud 182 there is rigidly secured a pointer 216 and a portion of the circumference of the disk 206 is provided with graduations (see Fig. 10). With this construction when the crank arm 206 is in a position with its latch in engagement with the last notch at the upper side of the disk 206, as shown in Fig. 10, the pivotal connection between the link 196 and the slide 202 is in its position nearest to the fulcrum stud 182. At this time the pointer 216 points to the graduation zero. For every notch that the latch 212 is advanced, from the position shown in Fig. 10, the distance between the pivotal connection of the link 196 to the slide 202 and the fulcrum stud 182 is increased because of the advance in the guideway 200 of the slide 202 and consequently the throw of the crank arm 194 is increased. This increases the amplitude of the movement of the swinging arm 66 which governs the length of feeding step. The disk 208 may be provided with a surface of celluloid 218 (Fig. 12) or similar material so that any special marks or graduations to show the length of feeding step desired for any particular size or style of shoe, peculiar to an individual manufacturer, may be made thereon.

The hook setting devices are automatically supplied with hooks at proper times during the operation of the machine by a mechanism comprising a hopper in which the hooks are placed loosely, raceways leading from the hopper to the setting devices, hook supplying devices within the hopper for supplying the raceways with hooks, and hook separating and feeding devices for transferring the hooks from the raceways to the hook anvils or carriers.

Referring first more particularly to Figs. 10, 16, 17 and 18, which best illustrate the raceways and hook separating and feeding devices, each of the raceways consists of a plate 220 secured at its upper end to the upper end of the hopper supporting bracket E and at its lower end to lugs 222 extending from the removable plate 78 (Fig. 7) which supports the guide plate 76. The plates 220 are adapted to enter the space between the head and shank of a hook and thus support the hooks as they pass sidewise along the plates from the hopper to the setting devices, the hooks as they approach these devices being oppositely disposed with relation to each other so as to be readily transferred from the raceways to the flanges of the hook anvils in position to be set in the work at opposite sides of the die holder. As the hooks pass down the plates 220 by the force of gravity, they are held thereupon by guard plates 224 arranged at right angles to the plates 220 and separated therefrom a sufficient distance to form slots to receive the necks of the hooks (see Figs. 17 and 18). The guard plates 224 are secured at their upper ends to the bracket E and at their lower ends to blocks 225 (Fig. 16) secured to the upper and lower sides of the removable plate 78. The hooks are transferred from the raceways to the flanges of the hook anvils at the time these anvils are in their retracted position and in the plane of the ends of the raceways. The means for transferring the hooks comprise hook separating and feeding fingers 226 which are arranged to reciprocate in the direction of the line of feed along the lower ends of the raceway plates 220 and in their reciprocation to engage the lowermost hook upon each raceway plate. Each of these fingers is pivotally mounted upon the lower end of a bent lever 228 and is provided with a rearwardly extending projection which is acted upon by a spring pressed pin 229 (see dotted lines Fig. 16) carried by the lever 228. The object of this construction is to allow the ends of the hook separating and feeding fingers to move in substantially straight lines. This object is further secured by guiding the fingers in their movements by straight portions 221 at the raceway ends 24, which portions are engaged by flanges 223 upon the fingers. The upper ends of the levers 228 are pivotally mounted upon the supporting plate 78. Intermediate their ends these levers are connected by a link 230 (Fig. 10) to a rigid lug 231 extending from the upper side of the work feeding cam lever 198. The hook separating and feeding fingers 226 are thus actuated from the cam lever which actuates the hook setting devices to feed the work and the operative connections between this lever and the fingers are such that during the feeding movement of the hook setting devices, the fingers are withdrawn from engagement with the hooks at the lower ends of the raceways, but during the return movement of the hook setting devices, after the work has been fed, the fingers are advanced into engagement with the lowermost hooks and these hooks are separated from the hooks remaining on the raceways and are placed upon the flanges of the hook anvils 132.

When the hook separating and feeding fingers are in their retracted positions, as shown in Fig. 18, the hooks are held on the raceways by means of spring pressed latches 232 pivotally mounted upon the blocks 225. As the fingers advance the lowermost hooks are engaged and moved to the required positions on the hook setting anvils, as indicated in Fig. 17. As the hooks are moved on to the anvils by the fingers 226, the latches 232 are displaced rearwardly and bear upon the necks of the hooks as they move forward, thereby holding each hook firmly against the inner edge of the flanges forming the hook anvils. The hooks which remain upon the raceways are held against downward movement, at this point of the operation of the hook separating and feeding fingers, by the engagement of the heads of the lowermost hooks then on the raceways with the inner surfaces of the feeding fingers (see Fig. 17). The fingers 226 remain in their advance positions while the hooks are being set and are not retracted a sufficient distance to withdraw their inner surfaces from the lowermost hooks on the raceways until after the hook anvils have been removed from the ends 24 of the raceways. The latches 232 are thus allowed to return to their original positions before the inner surfaces of the fingers 226 are withdrawn from engagement with the lowermost hooks on the raceways. When these lowermost hooks are thus released, they move downwardly along the raceways until stopped by the latches 232. The latches 232 and the guard plates 224, which, (Figs. 17 and 18) project beyond the ends 24 of the raceways, act as guides to prevent the hooks from being rotated as they are transferred from the raceways to the anvils. These parts also act to correctly position the hooks upon the anvils so that when the plungers 142 are moved inwardly the hooks will be in positions to be engaged and centered by the concaved ends of the hook holding pins 144.

To adapt the hook setting and feeding fingers for operation upon different sized hooks, the pivot pin connecting the link 230 and the lug 231 (Fig. 10) may be eccentrically mounted in the end of the link. A rotation of this pin will, therefore, change the positions of the ends of the fingers 226 when at the limit of their forward movement and thus adapt the fingers for operation upon hooks having different sized heads.

After a machine has been used for some time in setting hooks of a certain kind or color and it is desired to change the kind or color of the hooks, although the hopper can be readily removed and a new hopper substituted therefor containing the new kind of hook, as will be presently described, nevertheless the raceways will still be filled with the old kind of hooks which are retained thereupon by the latches 232. In order to permit the quick emptying of the raceways of any hooks that may be left thereon at a time when it is desired to change the kind of hook being operated upon, each of the latches 232 is provided with a thumb piece, or handle, 233, (Figs. 17 and 18) so that after a change of hoppers and before the machine is again set in operation to deliver hooks from the hopper to the raceways and while the fingers 226 are retracted, these handles may be seized by the operator and the latches 232 moved rearwardly manually thus permitting the hooks to fall by gravity out of the raceways and into the hand of the operator.

Owing to the fact that the thickness of the throat of different sized hooks varies, it is necessary, when it is desired to perform successive stints of work upon hooks of widely varying sizes, to remove the raceways which have been used for one size and replace them by raceways each having a guard plate at a different distance from the raceway plate. The raceways are so mounted upon the supporting plate 78 that when this plate is secured in the machine they are in the exact desired relation to the hook setting and work feeding devices. If the raceways were removed individually from their supporting plate and new raceways secured thereto, it would be necessary to readjust the new raceways to the location of the hook setting and work feeding devices. This would take time and would, therefore, be a costly change to make. It is, therefore, contemplated in the present invention to provide the machine with several raceway supporting plates 78, each having mounted thereon a different set of raceways, that is, different in the fact that they are adapted to receive different sized hooks. With this arrangement, in order to remove and replace any particular pair of raceways, it is only necessary to disconnect their upper ends from the supporting bracket E, disconnect the hook feeding finger link 230 from its lug 231, and remove the screws 77 (Fig. 7) which hold the plate 78 to the forward bracket C, when the supporting plate and all its connected parts can be removed conjointly from the machine. A new pair of raceways, which have previously been adjusted upon their supporting plate are then placed in the machine and these new raceways, having been preliminarily adjusted, will coöperate exactly with the hook setting and work feeding devices. The time which would have been taken in adjusting the new parts after they are in the machine is thus eliminated.

The hopper for containing the lacing hooks is of such shape that two streams of lacing hooks may be delivered simultaneously. The hopper is best shown in Figs. 29 and 30 and comprises side plates 234 and a circular shell 236 which is V-shaped in cross section, thus causing the hooks within the hopper to fall to each side into the path of the hook delivering mechanism which is located within the hopper adjacent the side plates. The hopper is removably supported upon the brackets D and E (Fig. 2) in a manner presently to be described in detail. The raceway plates 220 abut against the hopper just inside of its side plates and opposite the slots (Fig. 30) within which the hook delivering picker plates 238 (Fig. 28) operate. These picker plates are of the usual well known construction and are driven intermittently by a mechanism now to be described.

Each picker plate is provided with a hub 240 (Fig. 29) which is secured to a shaft 242 journaled in bearings in the side plates 234 and having at its inner end a disk 244 forming one member of a friction driving clutch. The other member of the friction clutch is formed by a second disk 246 (Figs. 29 and 31) which is secured centrally to a radially slotted wheel 248 mounted upon the hollow hub 250 of the disk 246 having a bearing in a casing 252 carried by the bracket D. The disks 244 and 246 forming the friction clutch are held in contact by means of a pin 254, (Fig. 29), provided with a hand wheel 256, threaded into the hopper shaft 242. With this construction when the disks of the clutch are in engagement, the hopper shaft 242 and hollow shaft 250 form substantially one shaft which rotates in the journals formed in the forward wall 234 of the hopper and the rear wall of the casing 252. The casing 252, below the radially slotted wheel 248, is provided with a short shaft 258 (Figs. 29 and 31) which carries at its forward end a crank arm 260 having a tooth 261 adapted to enter the slots of the wheel 248 in succession as the shaft 258 is rotated. The wheel 248 is also provided with a succession of concavities around its periphery which are adapted to be engaged successively by the convexly curved surface of a disk 259 on the hub of the crank 260 and lock the shaft 242 against rotation during the time that the pin 261 is disengaged from the radial slots in the wheel 248 (see Fig. 31). This mechanism is similar to what is known as the "Geneva stop motion" but it is different therefrom in that the actuator 260 and the convexly curved locking surface formed on its hub are in different planes. This construction permits the convexly curved locking surface carried by the actuator to extend angularly for more than 180° and, therefore, insures a rigid locking of the shaft 242 against rotation during the period of time that the pin 261 is disengaged from the radial slots of the wheel 248. Where the complemental curved locking surfaces are less than 180° in angular extent, the locking action is overcome before the radially slotted wheel is again engaged by its actuator and, therefore, there is an opportunity for the parts which are being held stationary, in this case the picker plates, to move and destroy their alinement with the raceways. The extended locking surface provided by the construction shown in Fig. 31 holds the picker arms successively at the ends of the raceways in a proper position for hooks to be delivered therefrom to the raceways during the entire time that the crank arm 260 is disengaged from the radial slots in the wheel 248.

The crank 260 is rotated continuously by the engagement of a worm gear 262 (Fig. 31), upon a shaft 264, with a second worm gear 266 (Fig. 29) threaded upon the hub of the crank. The shaft 264 is journaled in bearings formed therefor in the hopper supporting bracket E and a second bracket G at the left hand side of the machine (Figs. 3 and 4). Loosely mounted on this shaft is a pulley 268 vertically above the pulley 16 on the loose member of the main clutch. These two pulleys are connected by means of a rope belt 270. The shaft 264 is provided with an auxiliary clutch, indicated generally at 272, of which the pulley 268 is the loose member. This clutch is normally held in driving relation by means of a spring 274 but may be thrown out by a movement of the handle 276. During the time that the auxiliary clutch 272 is in operation, the shaft 264 will be continuously rotated from the loose member of the main clutch, which also is being continuously rotated from the power shaft. The picker plates will, therefore, be continuously supplying lacing hooks to the raceways. If it is desired to discontinue the supply of lacing hooks to the raceways, it is merely necessary to move the handle 276 in a direction to disengage the auxiliary clutch 272 and thereafter continued rotation of the pulley 268 will not affect the shaft 264.

As hereinbefore mentioned, it is desired at times to either change the size or style of lacing hook upon which the machine is to operate, or possibly its color, and instead of resorting to the slow process of removing all the loose lacing hooks from the hopper which is in the machine and then re-supplying that hopper with other lacing hooks of the kind or color desired, in the present machine the hopper is so mounted that it can at such times be readily and quickly removed and another substituted therefor. To this end the hopper is held to its support by means of bayonet joint and swing bolt and nut and slot connections, now to be described. Referring first to Figs. 4, 28 and 30, the upper end of the bracket E has pivoted thereto a swinging bolt 280 which is adapted to enter within a slot formed in a lug 282 (Fig. 29) projecting from the left hand lower quadrant of the hopper. After being swung in place in said slot, the hopper and bracket are drawn together by means of a nut 284 threaded on the bolt. Referring now to Figs. 1, 2, 30 and 31, the rear wall of the hopper is provided with a series of, in the present instance three, L-shaped lugs 286 which, with their outer faces, bear against the inner surfaces of guideways 288 (Fig. 31) formed at the periphery of the casing 252. Upon a rotation of the hopper, after the lugs 286 have been placed in contact with said guide-ways, said lugs will slip beneath projecting hooks 290 formed on said guideways so that the hopper is securely held from movement outwardly from the casing 252. This is, in effect, a bayonet joint. With a hopper mounted in this manner, in order to remove it from the machine it is merely necessary to first unscrew the pin 254 until it is free of the shaft 242 and the friction clutch formed by the disks 244 and 246 is thus disengaged, and then swing the bolt 280 out of its engagement with the slot in the lug 282 on the hopper, and finally give the hopper an angular bodily movement about the shaft 242 as an axis until the L-shaped lugs 286 are free of the hooks 290. After these operations the hopper may be pulled forwardly from the bracket D and taken from the machine. A new hopper may be quickly placed in operative position by a reversal of the operations just described.

The features of construction just described relating to the mechanisms for supplying and delivering fasteners are not claimed herein as such features are claimed in a divisional application filed July 23, 1910, Serial No. 573,420, patented October 21, 1913, No. 1,076,280.

When the machine is at rest and before the operator commences his stint, the work clamps 165 and 166 are in engagement with the guide plate 76, the punch and set actuating levers 150 and 151 are retracted so that the punching and setting devices are removed from the die holder which at this time is in position in the recess in the guide plate 76. The hook anvils 132 are in position at the raceway ends 24 to receive hooks from the raceways and the hook separating and feeding fingers 226 are in the position shown in Fig. 17 where they have just delivered hooks to the anvils. The punching and setting devices are at this time in the relation shown in Fig. 20 with the punches, the sets and the ends of the raceways all in the line of feed. The operator separates the work clamps manually and places his work in the machine against the proper gages in accordance with whether the work to be done is "blind hook" work or "through and through" work and thereafter he permits the work clamps to engage the work and hold it rigidly against movement on the guide plate.

On depressing the starting treadle the main clutch is thrown in and the first operative movements given to the machine are imparted from the cam 8 which acts to move the punch and set levers inward, first placing the hook holding pins 144 in engagement with the heads of the hooks and centering them and thereafter causing the punch hammers 162 to move the punches inwardly to perforate the stock. The parts at this time are in the relation shown in Fig. 21. The cam 8 thereafter moves the punch and set levers outwardly a sufficient distance to permit the spring plungers 116 to remove the punches from the work. The parts are now in the relative position shown in Fig. 22. During these operations all of the cams except the cam 8 are idle. The hook carrier cam 10 now comes into operation and acts through the cam lever 184 to move the two swinging frames 66 and 122 and with them the punching and setting devices in the line of feed and relatively to the work until the set dies 72 have reached a position beneath the perforations made by the punches. During this operation the cam 8 is idle. The parts are now in relative position shown in Fig. 23. This movement of the swinging arms relatively to the punch and set levers carries the punches out of alinement with the punch hammers although the plungers 142 of the setting devices are still in engagement with the tracks 164 carried by the punch and set levers. At this time the cam 8 again operates to move the punch and set levers inward, first to cause the feet 143 of the plungers 142 to engage the hook anvils 132 and after such engagement to force said anvils inwardly to the die holder and set the hooks supported by the anvils. The parts are now in the relative position shown in Fig. 24. During the hook setting operation all cams, with the exception of the punch and set lever cam 8, remain idle. Just at the time the hooks are set the work clamp cam 4 operates to withdraw the work clamps from their engagement with the work so as to permit the work to be fed and during this withdrawal of the work clamps the punch and set levers are moved outward slightly, which movement withdraws the hook anvils, and with them the clenched hooks, a slight distance from the setting dies sufficient to relieve the pressure of the anvils upon the hooks and permit the hooks to slide off the anvils during the work feeding operation. The parts are now in the relative position shown in Fig. 25.

As soon as the clenched hooks have reached positions where they will clear the setting dies, the work feeding cam 12 operates to move the swinging arm 66 in the line of feed by a movement of the cam lever 198, the crank arm 194 and the pinion 188. The hold of the work clamps upon the work having been released, the work is now free to move with the swinging arm 66 and accordingly as this arm moves relatively to the swinging arm 122 the hook holding devices are removed from the anvils or hook supporting plates 132 carrying the hooks with them. As soon as the clenched hooks are removed from said anvils the spring pressed pins 144 clamp them firmly against the setting dies and they are thus carried with the setting dies and the swinging arm to the end of their feeding movement. Immediately on the removal of the clenched hooks from the anvils, the anvils are retracted by the spring plungers 138 and again assume their normal position in the horizontal plane of the raceway ends 24. At the end of the feeding movement, the parts are in the relative position shown in Fig. 26.

During the time occupied by the feeding devices in feeding the work, the movement of the cam lever 198 causes the hook separating and feeding fingers 226 to be retracted to the position shown in Fig. 18 preparatory to delivering another pair of hooks to the hook supporting plates. After the work has been fed the work clamp cam 4 and the punch and set lever cam 8 act simultaneously to clamp the work in its new position upon the guide plate and to retract the hook holding devices from their engagement with the clenched hooks. The cams 10 and 12 at this time are idle. The parts are now in the relative position shown in Fig. 27.

The hook carrier cam 10 now acts upon its lever 184 to move the swinging arms 66 and 122 backwardly in unison until the hook supporting plates 132 have been brought to their hook receiving positions at the raceway ends, as shown in Fig. 17. Thereafter and without loss of time the work feeding cam 12 operates through its cam lever 198 to move the set dies and hook holding devices in alinement with the anvils and to bring the punches to a position beneath the punch hammers, when the parts are again in the relation shown in Fig. 20. Although the forward movement of the hook setting and work feeding devices is step by step, the return movements of these devices is continuous as the cam roll 199 is engaged by an active part of the cam 12 just at the time that the cam roll 185 enters an idle part of the cam 10. The movement of the cam lever 198, in the operation just described, acts to move the hook separating and feeding fingers 226 forward and cause them to deliver another pair of hooks from the raceways to the hook anvils.

All of the operations just described are repeated as long as the operator maintains the starting treadle depressed. As soon as he releases this treadle, the clutch cam 6 operates through the toggle 36, 38 to throw out the main clutch and stop rotation of the cam shaft 2. If it is desired merely to set a single pair of hooks and then stop the machine, the starting treadle is depressed and immediately released. In this case the cam shaft 2 passes through but a single revolution before it is again stopped.

Nothing herein contained is to be interpreted as limiting this invention in the scope of its application to use in connection with the particular machine, or the particular mode of operation, or both, herein illustrated and described. Obviously changes may be made in the form, character, and relation of the parts within the scope of the invention, the characteristic features of which are set forth in the claims by the intentional use of generic terms and expressions inclusive of various modifications; therefore, the invention is not limited to the details of construction and operation of the illustrated embodiment nor to the conjoint use of all its features but may be embodied in other forms within the terms and spirit of the following claims.

What is claimed as new is:—

1. A duplex lacing hook setting machine, having, in combination, a pair of oppositely disposed hook setting dies, a pair of oppositely disposed punch blocks adjacent said dies, lacing hook sets coöperating with said dies, punches coöperating with said blocks, means to deliver hooks in pairs to the sets, means to operate the punches, and operating means thereafter simultaneously to set the hooks in the holes made in the stock by the punches.

2. A duplex lacing hook setting machine, having, in combination, a die holder sustaining a punch block and a setting die in each face, a punch arranged opposite each block, a set arranged opposite each die, means to deliver hooks to the sets, means to operate the punches simultaneously to perforate the stock, means to bring said perforations and the sets and setting dies in alinement, and means to operate the sets simultaneously to set hooks in said perforations.

3. A duplex lacing hook setting machine, having, in combination, a plurality of punches, a plurality of setting devices, a plurality of gages to guide the edges of the lacing slit of an upper, means to operate the punches simultaneously to perforate the two opposite sides of an upper, means to place the setting devices in the positions previously occupied by the punches, raceways for delivering hooks to each of the setting devices, means coöperating with each of the raceways to engage the outer surface of a hook and feed it to setting position, and means to thereafter operate said devices to set hooks simultaneously in the perforations made by the punches.

4. A duplex lacing hook setting machine, having, in combination, pairs of oppositely disposed punch blocks and setting dies, pairs of punches and sets coöperating with said pairs of blocks and dies respectively, a guide plate for the work, work clamps on opposite sides thereof, means to operate the punches simultaneously to perforate the two sides of an upper while held from movement by said clamps, and means to shift the setting devices with lacing hooks held on the sets to the positions previously occupied by the perforating devices preparatory to setting the hooks while the work is still held from movement.

5. A duplex lacing hook setting machine, having, in combination, a die holder arranged to receive an upper with its two sides resting upon the opposite faces of the holder, dies secured in said holder, two oppositely disposed punches coöperating with said die holder for perforating the two sides of the upper, means for feeding hooks to setting position, and oppositely disposed hook setting devices also coöperating with said die holder for setting hooks in said perforations.

6. A duplex lacing hook setting machine, having, in combination, two oppositely disposed punches and two oppositely disposed hook sets all in the line of feed, a die holder between said parts to sustain the stock, means operating the punches to perforate the stock, and means to move all of said parts in the line of feed to place said sets in setting position over said perforations.

7. A machine for setting fasteners, having, in combination, punching and setting devices located side by side in the line of feed, means to deliver a fastener to the setting devices, means to operate said setting devices, and provision for moving said setting devices in the line of feed first to place the fastener in setting position and, after the setting operation is completed, to feed the work.

8. A machine for setting lacing hooks, having, in combination, a punch, a hook setting die, a hook anvil coöperating therewith to set a hook, means to operate the punch to perforate the work, means to move the anvil to hook setting position, and means to move the setting die to feed the work and remove the hook from the anvil.

9. A machine for setting lacing hooks, having, in combination, a punch, a hook anvil, means to deliver a hook thereto, a device for holding the hook on its anvil, means to operate the punch, means to move the hook anvil and holder in the line of feed to place the hook in setting position, and means to thereafter move the hook holder relatively to the anvil to feed the work.

10. A machine for setting lacing hooks, having, in combination, a die holder sustaining a punch block and a setting die both located in the line of feed, a punch, hook setting devices including an anvil, means to deliver a hook to said anvil, means to operate the punch and setting devices, provision for moving the punch and setting devices in unison in the line of feed before the hook is set to place the hook in setting position over the perforation made by the punch and for moving the punch and die holder relatively to the anvil in the line of feed after the hook is set, and means to hold the hook to the setting die during this latter movement whereby the work is fed.

11. A machine for setting fasteners, having, in combination, a raceway, fastener setting means, work feeding means including fastener holding devices normally at the end of the raceway and means to move said devices step by step away from the raceway in the same general direction in the fastener setting and work feeding operations first to setting position and thereafter to the end of the feeding movement.

12. A machine for setting lacing hooks, having, in combination, an anvil to receive a hook, means to hold the hook thereon, a punch, and means to move all of said parts in the line of feed, for a time in unison, and thereafter the punch and hook holding means relatively to the anvil.

13. A machine for setting lacing hooks, having, in combination, a raceway, a hook anvil, and a punch all in the line of feed, means to move the punch and anvil together in the line of feed, relatively to the raceway, for a time and thereafter to move the punch alone, and means for operating the punch and anvil.

14. A machine for setting lacing hooks, having, in combination, a raceway, a hook anvil arranged to move toward and from the end of the raceway, means to deliver a hook to said anvil, a punch, actuating means therefor, and means to move the hook and anvil in the line of feed relatively to the work to place the hook opposite the perforation made by the punch, and to thereafter move the hook and work relatively to the anvil to feed the work.

15. A machine for setting lacing hooks, having, in combination, a swinging arm, a punch supported thereby, a second swinging arm, a hook anvil supported thereby, a hook holding device supported by the first swinging arm, and means to swing said arms first in unison and then the former relatively to the latter.

16. A machine for setting fasteners, having, in combination, work feeding means, a raceway, fastener holding devices and a punch, and means to move said devices and punch step by step away from the raceway during the setting and work feeding operations and in one continuous movement toward the raceway after the completion of the work feeding operation.

17. A machine for setting fasteners, having, in combination, a die holder sustaining a punch block and a setting die both located in the line of feed, means to punch a hole in the work, means to move the die holder relatively to the work to place the setting die opposite the punched hole, and means thereafter to move the die holder and work in unison to feed the work.

18. A machine for setting fasteners, having, in combination, a punch, a punch block, fastener setting means including a fastener holding device and a setting die, and means to move said device and die step by step in the line of feed, first relatively to the work to place the setting die in the position previously occupied by the punch block and thereafter with the work to effect a feed thereof.

19. A machine for setting fasteners, having, in combination, a punch, a punch block, fastener setting means including a fastener holding device and a setting die, means to move said device and die step by step in the line of feed, first relatively to the work to place the setting die in the position previously occupied by the punch block and thereafter with the work to effect a feed thereof, and means for adjusting the extent of the latter step to vary the spacing of the fasteners.

20. A machine for setting fasteners, having, in combination, movable fastener carrying and work feeding devices, a cam and cam lever for moving said devices in the line of feed in unison, a second cam and cam lever for moving said work feeding devices alone, and means for varying the effective length of the lever of said second cam to vary the length of feeding step.

21. A machine for setting fasteners, having, in combination, two swinging arms, two cam levers one operatively connected to both of said arms and one operatively connected to one arm only, fastener setting and work feeding devices sustained by said arms, and cams constructed and arranged to actuate said levers successively, to move said arms first in unison and then one relatively to the other.

22. A machine for setting fasteners, having, in combination, movable fastener carrying and work feeding devices, an actuator operatively connected to both of said devices to move them in unison to place the fastener in setting position, means to set the fastener, and a second actuator operatively connected to the work feeding devices alone thereafter to move them in the work feeding operation.

23. A machine for setting fasteners, having, in combination, a movable fastener carrier, movable devices adapted to feed the work by engagement with the fastener, a cam, connections between said cam and said carrier and work feeding devices whereby they may be moved in unison, a second cam, and connections between said second cam and the work feeding devices whereby they may be moved independently of the carrier.

24. A machine for setting fasteners, having, in combination, a raceway, a fastener carrying member normally at the end of the raceway and mounted on a movable arm, means to deliver a fastener from the raceway to its carrier, means mounted on a second movable arm for holding the fastener on its carrier, separate operating trains of mechanism for moving said arms, an actuator for each train constructed and arranged to become operative successively, and a connection between said trains whereby one actuator moves both of said trains and arms in unison away from the raceway, but the other actuator moves its connected train and arm only.

25. A machine for setting fasteners, having, in combination, a raceway, a movable fastener carrier normally at the end of the raceway in a position to receive fasteners therefrom, a carrier cam having a cam lever operating to move said carrier, work feeding means engaging the fastener movable relatively to the carrier, a work feeding cam having a cam lever operating to move said means, and means connecting said cam levers constructed and arranged to impart a movement to both the carrier and work feeding means away from the raceway during the operative movement of the carrier cam but to impart a movement to the work feeding means only during the operative movement of the work feeding cam.

26. A machine for setting fasteners, having, in combination, a swinging arm sustaining a fastener carrier, a second swinging arm sustaining work feeding devices engaging the fastener, a carrier cam and cam lever, a link connecting said lever to the carrier arm, a work feeding cam and cam lever, a toothed segment pivotally mounted on the carrier cam lever, a link connecting said segment and work feeding cam lever, a pinion pivoted on the carrier cam lever and engaging said segment, and a link connected at one end to the work feeding arm and at its other end eccentrically to said pinion, whereby the carrier cam actuates both of said arms but the work feeding cam actuates its arm only.

27. A machine for setting fasteners, having, in combination, two levers arranged in the same general direction, an auxiliary arm having a toothed segment loosely pivoted on one lever, a pinion loosely pivoted on said lever in mesh with said segment, a link connecting said auxiliary arm and the other lever, cams for actuating said levers operating first to roll the pinion along the segment and to thereafter rotate the pinion by a movement of the segment, and fastener carrying and work feeding devices connected to be operated by the movements of said levers first to place a fastener in setting position and thereafter to feed the work.

28. A machine for setting lacing hooks, having, in combination, a punch, operating means therefor, a combined hook positioning and work feeding mechanism, and means acting after the stock has been perforated for operating said mechanism to first position a hook and then feed the work.

29. A machine for setting lacing hooks, having, in combination, a punch, operating means therefor, a combined hook positioning and work feeding mechanism, and two separate actuators therefor, one controlling the setting position of the hook and one controlling the feed of the work.

30. A machine for setting lacing hooks, having, in combination, a combined hook positioning and work feeding mechanism, means to actuate said mechanism in the line of feed to position a hook for the setting operation, means to set the hook so positioned, and means to actuate said mechanism to thereafter feed the work.

31. A machine for setting lacing hooks, having, in combination, a combined hook positioning and work feeding mechanism, two cams controlling its hook positioning and work feeding movements timed to operate upon said mechanism successively, and hook setting means timed to operate between the operations of said cams.

32. A machine for setting lacing hooks, having, in combination, duplex hook setting mechanism, a support, and means for positioning an upper thereupon with reference to the lacing slit and its top in order to properly locate the first hooks to be set, comprising gages to guide the edges of the lacing slit and an adjustable gage to abut against the top of the upper on both sides.

33. A machine for setting lacing hooks, having, in combination, hook setting mechanism, a support, and means for positioning an upper, having eyelets previously set therein, upon the support in order to properly locate the first hook to be set comprising an edge gage to guide the edge of the lacing slit and an eyelet gage to which the uppermost eyelet is presented while the lacing slit is against the edge gage.

34. A machine for setting lacing hooks, having, in combination, hook setting mechanism, work feeding mechanism, operating means for said mechanisms, a hopper, hook supplying mechanism including a raceway having a hook separator, and a guide plate for the work, all connected to coöperate with said mechanisms, said raceway, hook separator and guide plate being mounted on a common removable supporting plate to permit removal conjointly from the machine and replacement by similar parts on a duplicate supporting plate for use with a different sized hook by virtue of which construction and arrangement the substitution can be made without disturbing the setting and work feeding mechanisms.

35. A machine for inserting hooks, having, in combination, a raceway, means for delivering hooks to the raceway, an intermittently operating hook separating means for discharging hooks from the raceway, a pivoted gate fulcrumed adjacent the raceway passage normally retaining a line of hooks in the raceway, and means whereby said gate may be turned on its pivot away from the raceway passage to permit the whole line of hooks to be discharged independently of the hook separating means.

36. A duplex hook setting machine, having, in combination, duplex hook setting mechanism and means for positioning an upper with reference to the top of the upper or with eyelets which have been previously set in the upper, comprising an adjustable gage to abut against the top of the upper, and an adjustable gage to which an eyelet may be presented, according to the type of upper in which the hooks are to be set.

37. A machine for setting lacing hooks, having, in combination, a raceway, a combined hook positioning and work feeding mechanism, actuating means to move said mechanism with a hook thereon away from the raceway to position a hook for the setting operation, means to set the hook so positioned, and actuating means to thereafter move said mechanism to feed the work.

38. A machine for setting lacing hooks, having, in combination, a raceway, a combined hook positioning and work feeding mechanism, means for separating a hook from the raceway and delivering it to said mechanism, means to actuate said mechanism to position the hook for the setting operation, means to set the hook so positioned, and means to actuate said mechanism to thereafter feed the work.

39. A duplex lacing hook setting machine, having, in combination, a plurality of punches, a plurality of setting devices, means for operating the punches simultaneously to perforate an upper, means to deliver hooks to the setting devices, means to place the setting devices with the hooks thereon in the position previously occupied by the punches, and means for simultaneously setting the hooks in said perforations.

40. A duplex lacing hook setting machine, having, in combination, a plurality of punches, a plurality of setting devices, means for operating the punches simultaneously to perforate an upper, a raceway to deliver hooks to the setting devices, means to remove hooks from the raceway and place them upon the setting devices, and means to locate the setting devices and hooks in the position previously occupied by the punches and set hooks in said perforations.

41. A machine for setting lacing hooks or the like, having, in combination, two reversely and oppositely arranged setting dies and two reversely and oppositely arranged punch blocks, two opposed hook supporting plates and two opposed punches coöperating with the dies and blocks respectively, and mechanism for delivering hooks to said plates whereby two opposed hooks may be set.

42. A machine for setting lacing hooks or the like, having, in combination, a die holder provided with a hook setting die and a punch block on each side respectively, the dies and blocks being arranged one in line with the other, two opposed hook supporting plates, two opposed punches, mechanism for delivering hooks to said plates, mechanism for reciprocating said plates and punches, and mechanism for disengaging said plates from the hooks after the setting operation.

43. A machine for inserting fasteners, having, in combination, a movable carrier, a punch sustained by said carrier, means to move said punch toward and from the work, and mechanism adapted to move said carrier in the line of feed comprising two levers and a link connecting said levers together, said link being pivoted at one end to one of said levers, and adjusting means connected with said link adapted to pivotally connect the other end of said link to the other of said levers at different distances from the axial center of said last mentioned lever.

44. A machine for inserting fasteners, having, in combination, a work feeding tool, and means for moving said tool in the line of feed varying distances from a fixed point comprising two levers and a link connecting said levers together, said link being pivoted at one end to one of said levers and having an adjustable connection for pivotally connecting the other end of said link to the other lever at different distances from the axial center of said last mentioned lever.

45. A machine for inserting fasteners, having, in combination, a movable carrier, a work feeding tool sustained by said carrier, means to operate the tool to engage the work, and means for moving the carrier in the line of feed varying distances from a fixed point comprising a pivotally mounted link, and a lever having a slot formed with a radius equal to the effective length of the link, said link having an adjustable pivotal connection in the slot of said lever such that the connecting point may be set at different distances from the axial center of said lever.

46. A machine for setting lacing hooks, having, in combination, an up-setting die, means coöperating therewith to set a hook, hook engaging means, mechanism for actuating said means to feed the work, and means for slightly relieving the pressure between the up-setting die and its coöperating hook setting means prior to the work feeding movement of the hook engaging means.

47. A machine for setting lacing hooks having, in combination, an upsetting die, an anvil, means for holding a hook on the anvil, means to relatively move the anvil, and holding means and the upsetting die to set the hook and then withdraw them slightly to relieve the pressure on the hook, and means thereafter to move the holding means to feed the hook from off the anvil.

48. A machine for setting lacing hooks, having, in combination, hook setting means comprising two opposed pressure applying members, a clamp for holding the hooks in engagement with one of said members, and mechanism for moving said members into a pressure relation to set the hook and thereafter to slightly relieve the pressure to facilitate feeding the work.

49. A machine for setting lacing hooks, having, in combination, an upsetting die, an anvil, a clamp for holding a hook on the anvil, means for moving the anvil and clamp to set the hook and then slightly withdraw them from the die to facilitate feeding the work, and means to move the die and clamp to feed the set hook off of the anvil.

50. A machine for setting lacing hooks, having, in combination, a pair of oppositely disposed hook setting dies, a pair of oppositely disposed anvils, means for relatively moving the dies and anvils to bring them into a pressure relation upon the hooks to set them, and means to thereafter relatively move the dies and anvils to slightly relieve the pressure on the hooks to facilitate feeding the work while the dies and anvils retain engagement with the hooks.

51. A machine for setting lacing hooks having, in combination, two sets of two coöperating hook-setting dies, means for relatively reciprocating the dies of each set to set hooks, means for moving one of the dies of each set in the line of feed while in engagement with the work to feed the work, and means for relieving the pressure of said work-feeding dies on the work prior to entering on their feeding movement.

52. A machine for setting lacing hooks and the like, having, in combination, two oppositely facing punches, two opposed sets of hook setting devices, mechanism for delivering hooks to each set of hook setting devices, and means for operating said devices to set two opposed hooks in the holes made by the punches.

53. A duplex lacing hook setting machine, having, in combination, reversely arranged upsetting dies, reversely arranged dies coöperating with the upsetting dies to set hooks in two sheets of material having their surfaces oppositely disposed, means independent of the die part for engaging and feeding two hooks to the required positions between each upsetting die and its coöperating die, means for operating said dies to set the hooks, and punching mechanism for forming perforations in the two sheets of material in which said hooks are set.

54. A duplex lacing hook setting machine, having, in combination, two reversely arranged setting dies in line with each other, two opposed hook supporting plates coöperating therewith, two punch mechanisms, mechanism for feeding hooks onto said plates whereby two opposed hooks may be set, and means operating first to actuate the punch mechanisms and then set the hooks in the perforations thus formed.

55. A duplex lacing hook setting machine, having, in combination, means for sustaining a shoe upper, punch mechanisms for perforating both of the edge portions of said upper when so sustained, dies bearing respectively against the inner surfaces of said edge portions opposite said perforations, and hook setting devices coöperating with said dies.

In testimony whereof I affix my signature, in presence of two witnesses.

GEORGE GODDU.

Witnesses:
WARREN G. OGDEN,
RUTH A. SIMONDS.

It is hereby certified that in Letters Patent No. 1,217,089, granted February 20, 1917, upon the application of George Goddu, of Winchester, Massachusetts, for an improvement in "Machines for Inserting Fasteners," an error appears in the printed specification requiring correction as follows: Page 5, line 47, for the word "hands" read *heads;* and that the said Letters Patent should be read with this correction therein that the same may conform to the record of the case in the Patent Office.

Signed and sealed this 17th day of April, A. D., 1917.

[SEAL.]

R. F. WHITEHEAD,
*Acting Commissioner of Patents.*

Cl. 218—17.